United States Patent [19]
Apostolides

[11] Patent Number: 5,957,240
[45] Date of Patent: Sep. 28, 1999

[54] APPARATUS FOR ENGINE OIL REPLACEMENT

[75] Inventor: John K. Apostolides, Pittsburgh, Pa.

[73] Assignee: RPM Industries, Inc., Washington, Pa.

[21] Appl. No.: 08/908,734

[22] Filed: Aug. 7, 1997

[51] Int. Cl.[6] .................................................. F01M 11/10
[52] U.S. Cl. ............................................ 184/1.5; 184/6.24
[58] Field of Search ..................................... 184/1.5, 6.24

[56] References Cited

U.S. PATENT DOCUMENTS

| | | | |
|---|---|---|---|
| D. 327,277 | 6/1992 | Bellis . | |
| 3,583,525 | 6/1971 | Holcomb | 1/16 |
| 3,583,527 | 6/1971 | Raichel . | |
| 3,722,623 | 3/1973 | Waldecker . | |
| 3,802,564 | 4/1974 | Turman . | |
| 3,917,027 | 11/1975 | Hakanson et al. . | |
| 4,014,794 | 3/1977 | Lewis . | |
| 4,061,204 | 12/1977 | Kautz, Jr. . | |
| 4,094,293 | 6/1978 | Evans . | |
| 4,112,910 | 9/1978 | Percy . | |
| 4,157,744 | 6/1979 | Capriotti | 1/16 |
| 4,199,950 | 4/1980 | Hakanson et al. | 1/8 |
| 4,402,287 | 9/1983 | Cochran . | |
| 4,502,451 | 3/1985 | Duprez . | |
| 4,875,551 | 10/1989 | Lulich | 11/3 |
| 5,236,064 | 8/1993 | Wagoner | 184/6.3 |
| 5,327,862 | 7/1994 | Bedi | 123/196 R |
| 5,390,762 | 2/1995 | Nelson | 184/1.5 |
| 5,431,138 | 7/1995 | Hurner | 123/196 A |
| 5,443,138 | 8/1995 | Bendi et al. | 185/1.5 |
| 5,452,695 | 9/1995 | Bent | 123/196 A |
| 5,566,781 | 10/1996 | Robert et al. | 184/1.5 |

*Primary Examiner*—John A. Jeffery
*Assistant Examiner*—David Fenstermacher
*Attorney, Agent, or Firm*—Kirkpatrick & Lockhart LLP

[57] ABSTRACT

Apparatus for changing oil in an engine that has a main oil pump for circulating oil through an oil filter attached to a filter head of the engine. The apparatus preferably includes an adapter ring that has at least one passage for receiving oil from the filter head and at least one auxiliary port that communicates with at least one passage. The invention includes a coupler for attaching the adapter ring to the filter head such that a fluid-tight seal is achieved between the adapter ring and the filter head. The coupler permits the adapter ring to be selectively indexable relative to the filter head about a first axis. The coupler further enables the oil filter to be removably attached thereto such that a fluid-tight seal is achieved between the oil filter and the adapter ring. A coupling assembly is attached to each auxiliary port for selectively blocking the port and permitting the port to be opened upon attachment of a first conduit thereto. Various conduit arrangements may be attached to the auxiliary ports to facilitate rapid changing of engine oil. Sensors may also be attached to the auxiliary ports for monitoring conditions within the engine.

6 Claims, 20 Drawing Sheets

APPARATUS FOR ENGINE OIL REPLACEMENT

BACKGROUND OF THE INVENTION

1. Field of the Invention

The present invention relates to lubrication methods and apparatuses and, more particularly, is directed to methods and apparatuses for replacing engine oil.

2. Description of the Invention Background

Nicholas Otto has been credited with the invention of the internal combustion engine which is the predecessor of the engines that are found in today's automobiles, trucks, etc. While present-day sophisticated engines may differ in appearance from Otto's engine, today's engines similarly require lubrication to reduce damaging friction that is generated between rapidly moving engine parts. Such friction can reduce the engine's efficiency and result in the accumulation of heat in the moving parts which can result in premature part failure. Engine designers have recognized this fact and have developed methods of utilizing liquid lubricants for preventing excessive wear and for removing heat from areas of relatively high temperature. Those lubrication systems typically comprise, among other things, an oil pump for circulating oil from a reservoir through the engine. The oil collects in a reservoir that is usually equipped with a drain plug for oil changing purposes and a removable oil filter is attached to the engine for filtering debris such as dirt and metal chips from the oil stream.

Many modern automobile manufacturers recommend changing engine oil at least every 3500–5000 miles depending upon the type of driving conditions that are encountered. In dusty environments, for example, more frequent oil changes may be warranted. Large trucks and earth moving equipment are examples of vehicles requiring frequent oil changes to prevent excessive engine wear.

Over the years, various improvements have been made to engine lubricants and lubricating systems. For example, chemically-enhanced and synthetic engine oils have been developed which contain materials that tend to cling to the cylinder walls and pistons to prevent those parts from experiencing excessive wear during initial start up. An even more effective system is disclosed in U.S. Pat. No. 4,875,551 to Lulich which comprises a pre-lubricant oil pressure adapter that enables oil and oil pressure to be supplied to the engine before it is engaged to crank. The adaptor includes an oil pump that is linked to an oil system of an engine. When the engine is started, a delay switch allows the pump to operate, but it prevents the engine from cranking. The switch senses when the pressure is great enough in the engine and, thereafter, permits the engine to start. Other lubrication systems are disclosed in U.S. Pat. Nos. 3,583,525; 3,583,527; 3,722,623; 3,917,027; 4,061,204; 4,094,293; 4,112,910; 4,157,744; 4,199,950; and 4,502,431.

The processes of draining and adding oil have changed very little over the years. While arrangements of the type described above have been directed to improving the lubrication process, in many engine configurations, the design and maintainability of the lubrication system, nonetheless, often have not been primary design considerations. Thus, in many modern engines, oil filter access is limited, which can make the oil changing process difficult and time-consuming. Such prior methods involved removing a drain plug in an oil pan that is located at the bottom of the engine. The oil stream then exits the pan through the drain hole under the influence of gravity. To facilitate collection of such contaminated oil for disposal or recycling purposes, various types of catch pan arrangements have been developed. However, should the catch pan be improperly oriented under the drain hole during the entire draining process, oil can be splashed and spilled onto the engine and surrounding environment.

Many modern day engines employed in connection with earthmoving equipment can maintain 100 or more gallons of oil in the their lubrication systems. To drain such amount of oil solely under the influence of gravity through a typically small drain hole can take an excessive amount of time, leading to undesirable downtime of the machinery. Similarly, present day lubrication systems are typically filled through a fill spout through which the lubricant is poured under the influence of gravity. While a variety of different discharge spout arrangements for use with oil filled containers have been developed to facilitate the addition of lubricant into the engine, oil can be spilled onto the engine during the insertion of the container's discharge spout into the fill spout of the engine and also during its removal therefrom.

While the use of lubrication is necessary to reduce damaging friction and heat generated between moving parts of an engine, engine designers have appreciated that engine cylinders must also be cooled to maintain a lubricant film on the cylinder walls and other sliding surfaces. In particular, designers have appreciated that the cylinder heads, pistons, and exhaust valves must be cooled to prevent combustion knock or destruction of these parts from overheating. In addition, it is commonly known that the lubricant must be cooled to maintain a desired viscosity under operating conditions. To achieve such cooling, water or air cooling systems are generally employed.

In a water-cooled system, a water jacket arrangement is provided in the engine block for facilitating the passage of cooling water therethrough. Passages in the jacket communicate with a radiator which serves to cool the water as it flows through the radiator. To prevent the water from freezing and damaging the cooling system, an anti-freeze medium such as ethylene glycol is typically added to the water. At times, the water jacket can develop a leak which permits the water/glycol mixture to enter the oil stream within the engine which can result in damage to the cylinders and/or pistons. Prior lubrication systems have been unable to detect the presence of glycol, fuel or other unwanted chemicals in the oil.

Thus, there is a need for a method and adapter apparatus that can facilitate the pre-lubrication of an engine prior to the starting thereof that is readily adaptable to a variety of different engine configurations for ease of installation and maintenance of the lubrication system.

There is still another need for a method and adapter apparatus that can facilitate rapid evacuation or draining of oil from the lubrication system of an engine with minimal spillage.

There is yet another need for a method and adapter apparatus having the above-mentioned attributes that can also facilitate the rapid addition of lubricant to the lubrication system of an engine.

There is another need for a method and adapter apparatus that can facilitate the monitoring of the lubricant stream to detect the presence of unwanted chemical materials therein.

SUMMARY OF THE INVENTION

In accordance with a preferred form of the present invention, there is provided apparatus for changing oil in an engine that has a main oil pump for circulating oil through an oil filter attached to a filter head of the engine. In a preferred form, the apparatus comprises an adapter ring having at least one passage therethrough for receiving oil from the filter head and at least one first auxiliary port communicating with at least one passage. The apparatus further includes a coupler for attaching the adapter ring to the filter head such that a first fluid-tight seal is achieved between the adapter ring and the filter head and such that the adapter ring can be selectively indexed relative to the filter head about a first axis. The coupler preferably has an attachment portion for removably attaching the oil filter thereto such that a second fluid-tight seal is achieved between the oil filter and the adapter ring while permitting oil to flow through the passages in the adapter ring into the oil filter. The coupler also facilitates passage of the filtered oil through the adapter ring to the filter head. The apparatus also preferably comprises a coupling assembly corresponding to each auxiliary port and being constructed to selectively block the corresponding auxiliary port and permit the corresponding auxiliary port to be opened upon attachment of a first conduit thereto to permit oil to pass from the adapter ring through the first conduit.

Another preferred embodiment of the present invention comprises a filter head for attaching an oil filter to an engine having an oil reservoir and a main pump for circulating oil through the engine. This embodiment preferably includes a first passageway that communicates with the discharge port of the main pump. The apparatus further includes a second passageway for carrying oil through the engine to the oil reservoir and a coupler for removably attaching the oil filter to the filter head such that oil passing through the first passageway enters the oil filter to be filtered and the filtered oil returns to the engine through the second passageway. In addition, the filter head preferably includes at least one auxiliary port in the filter head and a coupling assembly that corresponds to each auxiliary port. Each coupling assembly is constructed to selectively block the corresponding auxiliary port and permit the corresponding auxiliary port to be opened upon attachment of a first conduit thereto to permit oil to flow between the filter head and the first conduit.

The present invention also comprises a method for adding oil to an engine that has a main pump for circulating oil from an oil reservoir through a filter head and an oil filter. In a preferred form, the method comprises the action of attaching an adapter ring between the filter head and the oil filter. The adapter ring has at least one passage therethrough for permitting oil to flow from the filter head into the oil filter and a return passage for permitting the oil to flow from the oil filter to the filter head. The adapter ring further has at least one auxiliary port that communicates with a corresponding passage and a coupling assembly that corresponds to each auxiliary port. Each coupling assembly serves to selectively block its corresponding auxiliary port and permits the corresponding auxiliary port to be opened when a corresponding first conduit is attached thereto. The preferred method further comprises the action of attaching a first conduit to one of the auxiliary ports and coupling an auxiliary pump to the first conduit. The auxiliary pump is attached to a source of oil and is energized to pump oil from the source of oil through the first conduit and adapter ring into the filter head.

Another preferred method of the present invention comprises a method for draining oil from an engine that has a main pump for circulating oil from an oil reservoir portion of the engine through a filter head and an oil filter. In a preferred form, the method comprises the action of attaching an adapter ring between the filter head and the oil filter. The adapter ring has at least one passage therethrough for permitting oil to flow from the filter head into the oil filter and a return passage for permitting the oil to flow from the oil filter to the filter head. The adapter ring also preferably has at least one auxiliary port that communicates with a corresponding passage and a coupling assembly that corresponds to each auxiliary port for selectively block the auxiliary port and to permit the auxiliary port to be opened when a corresponding conduit is attached thereto. The method also preferably comprises the actions of attaching a drain conduit to one of the auxiliary ports and operating the main oil pump to pump oil from the oil reservoir through the filter head and adapter ring into the drain conduit.

Another preferred method of the present invention comprises a method of adding oil to an engine that has a filter head for attaching an oil filter thereto. The preferred method comprises the action of providing a port in the filter head which adjoins at least one oil passage therein. The preferred method further comprises the action of attaching a coupling assembly to the port to selectively blocking the port and permit the port to be opened when a conduit is attached thereto. Another preferred action of this method comprises attaching a first conduit to the coupling assembly and coupling an auxiliary pump to the first conduit. The auxiliary pump is coupled to a source of oil and energized to pump oil from the source of oil through the first conduit into the filter head.

Another preferred method of the present invention includes a method for draining oil from an engine that has a main oil pump for circulating oil from an oil reservoir portion of the engine through a filter head and an oil filter. In a preferred form, the method comprises the action of providing a port in the filter head which adjoins at least one passage in the filter head and attaching a coupling assembly to the port. The coupling assembly selectively blocks the port and permits the port to be opened when a conduit is attached thereto. Another preferred action comprises attaching a drain conduit to the coupling assembly and energizing the main pump to pump oil from the reservoir through the filter head and into the drain conduit.

It is a feature of the present invention to provide an apparatus for attaching an oil filter to a filter head of an engine that has at least one auxiliary port for attaching a conduit for oil changing purposes.

It is a further feature of the present invention to provide an apparatus of the type described above that can be selectively indexed relative to the filter head to advantageously locate the auxiliary ports.

It is another feature of the present invention to provide apparatus having the above-mentioned attributes that can be employed with an auxiliary pump for adding oil to an engine.

Yet another feature of the present invention is to provide an apparatus with the above-mentioned attributes that can be used in connection with a supplemental oil pump for pre-lubricating the engine prior to engine start up.

Another feature of the present invention is to provide an apparatus with the above-mentioned attributes that enables at least one sensor to be employed to monitor conditions within the engine such as oil pressure or the presence of contaminates in the oil stream.

Another feature of the present invention is to provide methods for expediently adding and draining oil from an engine.

Accordingly, the present invention provides solutions to the aforementioned problems associated with engine lubrication systems. The reader will appreciate that, in addition to the aforementioned details and objects, advantages associated with the use of the present invention will become apparent as the following detailed description of present preferred embodiments thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF PREFERRED EMBODIMENTS

Figure 1:
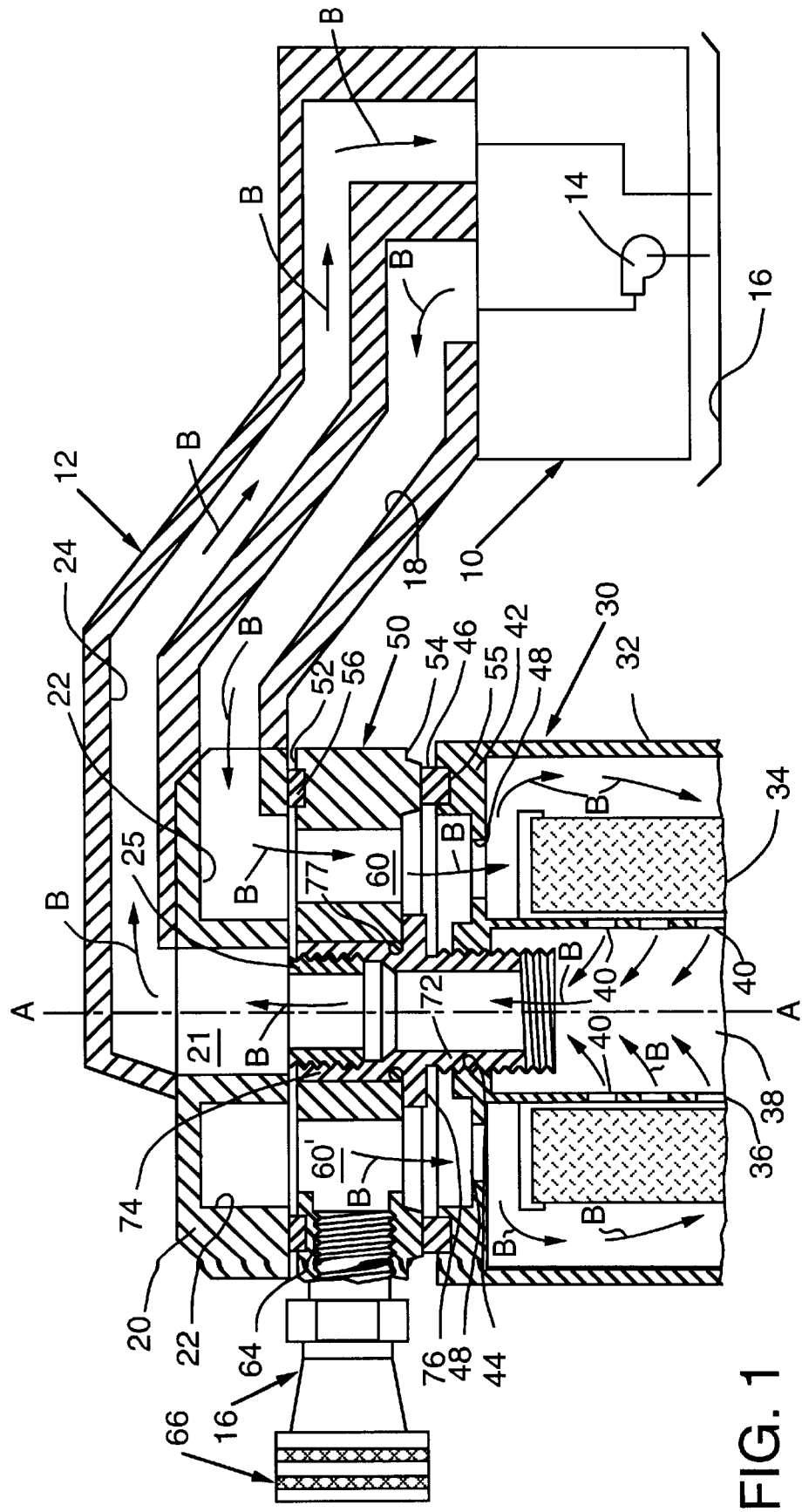
FIG. 1 is a cross-sectional view of a preferred adapter ring of the present invention attached to a filter head of an engine.

Referring now to the drawings for the purposes of illustrating present preferred embodiments of the invention only and not for purposes of limiting the same, the Figures show a preferred adapter ring 50 of the present invention attached to a filter head 12 of an engine, generally designated as 10. The skilled artisan will appreciate that the subject invention can be successfully employed with a variety of different engine configurations that require lubrication. Accordingly, the scope of protection afforded to the various preferred embodiments of the present invention should not be limited to a specific type or size of engine.

More specifically and with reference to FIG. 1, there is shown a preferred adapter ring 50 attached to a filter head 12 of an engine 10. The engine is shown in diagrammatical format; the filter head is shown in more detail for describing the function and arrangement of the present invention. The skilled artisan will appreciate that most engines that require some form of liquid lubricant such as commercially available motor oil are provided with a filter head 12 for receiving a commercially available oil filter 30 for filtering dirt and debris from the oil as it is circulated through the engine 10 by a main oil pump 14.

As can be seen FIG. 1, a typical engine 10 has an oil reservoir 16 or drain pan into which the oil accumulates and is pumped therefrom by the main oil pump 14 through a first passage 18 in the filter head 12. The first passage 18 adjoins an annular passage 22 in a filter-receiving portion 20 of the filter head 12. Centrally disposed within the filter-receiving portion 20 is a central return passage 21 that extends through a threaded connector member 25. Central return passage 21 communicates with a second passage 24 in the filter head 12 to define a passage for the oil to return to the engine 10. Those of ordinary skill in the art will recognize that the filter-receiving portion 20 and the threaded connector member 25 are sized to interface with commercially available oil filters of the type depicted in FIG. 1. Such an oil filter 30 typically comprises a metallic canister 32 that houses a cylindrical-shaped filter medium 34. Centrally disposed within the canister 32 is a hollow cylindrical member 36 that defines a discharge passage 38. The cylindrical member 36 has a plurality of holes 40 therethrough to enable oil passing through the filter medium 34 to flow into the discharge passage 38. The canister 32 has an attachment end 42 that has a threaded bore 44 that corresponds to the discharge passage 38. Also, to permit unfiltered oil to enter the canister 32 to be filtered, a plurality of equally spaced holes 48 are provided through the attachment end 42 as shown in FIG. 1. The filter 30 is also typically provided with an O-ring 46 that is adapted to establish a fluid-tight seal between the attachment end 42 of the canister 32 and the filter-receiving portion 14 of the filter head 12 of an engine 10.

A preferred adapter ring 50 of the present invention is depicted in FIGS. 1–4. As can be seen in those Figures, the adapter ring 50 is preferably circular in shape and sized to cooperate with the filter-receiving portion 14 of the filter head 12 and the oil filter 30. In a preferred embodiment, the adapter ring 50 is fabricated from aluminum; however, other materials could be successfully employed. Adapter ring 50 preferably has an upper surface 52 that is adapted to interface with the filter-receiving portion 14 of the filter head 12 and a lower surface 54 that is adapted to interface with the oil filter 30. The upper surface 52 is preferably provided with a ring seal 56 that is received within a channel 55. See FIG. 1. Those of ordinary skill in the art will appreciate that the ring seal 56 serves to establish a fluid-tight seal between the upper surface 52 of the adapter ring 50 and the filter-receiving portion 14 of the filter head 12. Also in a preferred embodiment, the lower surface 54 of the adapter ring 50 is provided with a raised rim portion 58 that is adapted to engage the ring seal 46 attached to the oil filter 30 to establish a fluid-tight seal between the lower surface 54 of the adapter ring 50 and the oil filter 30.

Figure 4:
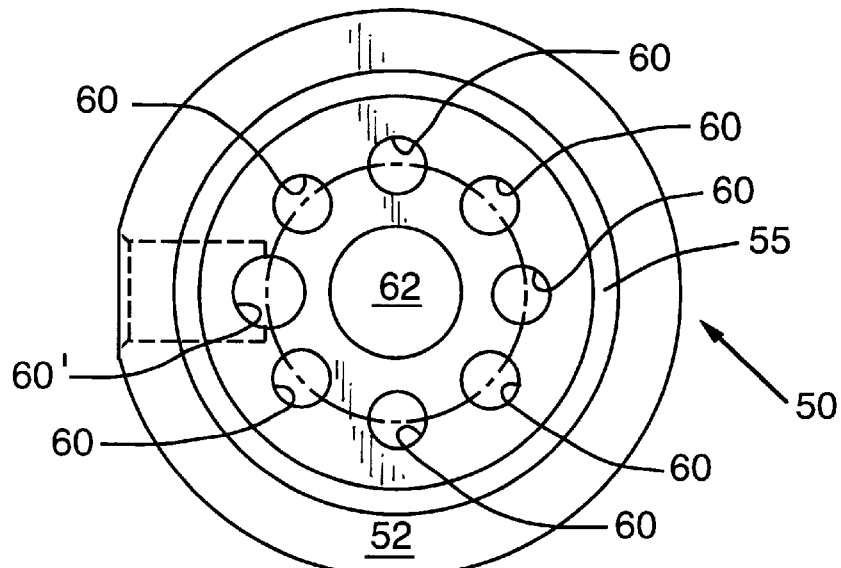
FIG. 4 is a top view of the adapter ring of FIGS. 1–3.
Figure 3:
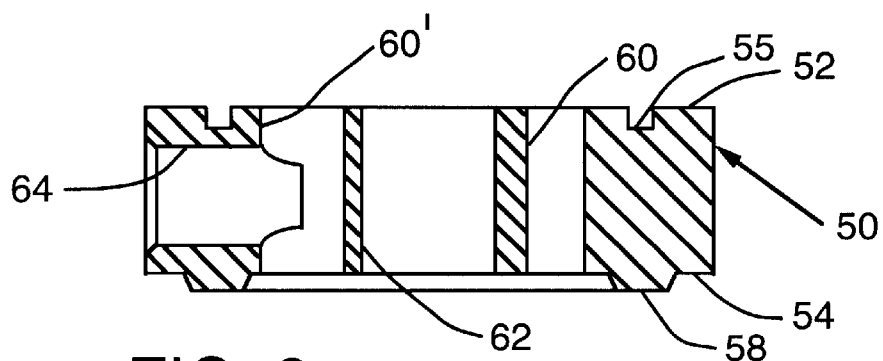
FIG. 3 is a cross-sectional view of the adapter ring of FIGS. 1 and 2 taken across line III—III in FIG. 2.
Figure 2:
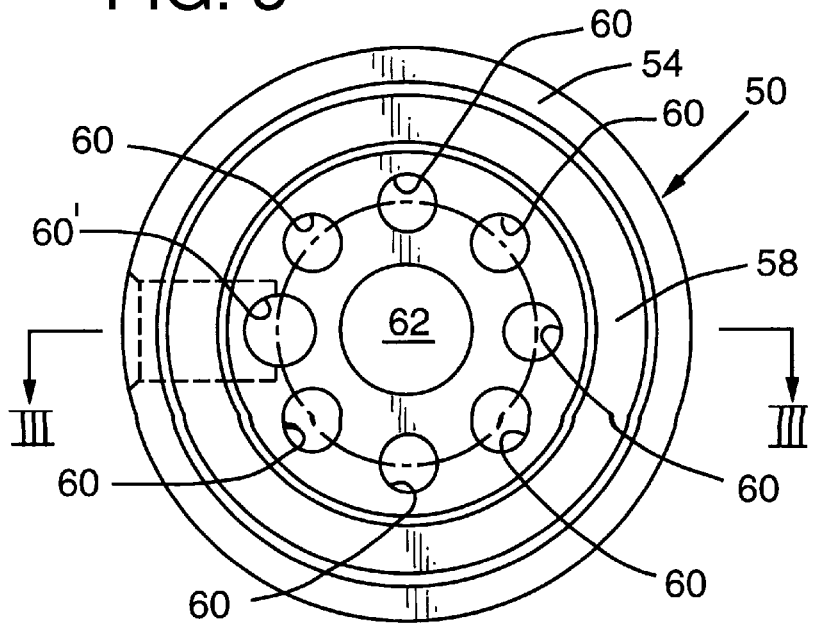
FIG. 2 is a bottom view of the preferred adapter ring depicted in FIG. 1.

In a preferred embodiment, at least one and preferably eight through passages 60 are equally spaced about a central bore 62 as shown in FIGS. 2–4. Although the through passages 60 are depicted as having circular shape, such passages could comprise arcuate slots or other appropriately-shaped openings. In the preferred embodiment, at least one threaded bore 64 is provided through the side of the adapter ring 50 such that it extends into a corresponding through passage 60'. As can be seen in FIGS. 2–4, through passage 60' is preferably slightly larger in diameter than the other through passages 60 and serves to define a larger flow path for draining oil through the adapter ring 50 in a preferred manner as will be described below. Such threaded bore 64 is adapted to receive a commercially available quick-disconnect coupling assembly 66 that has a normally closed valve therein such as those couplings manufactured by Aeroquip Corporation of Ohio, U.S.A. under Model No. FD45-1004-8-10. See FIG. 1. However, other coupling arrangements could be successfully employed.

Figure 5:
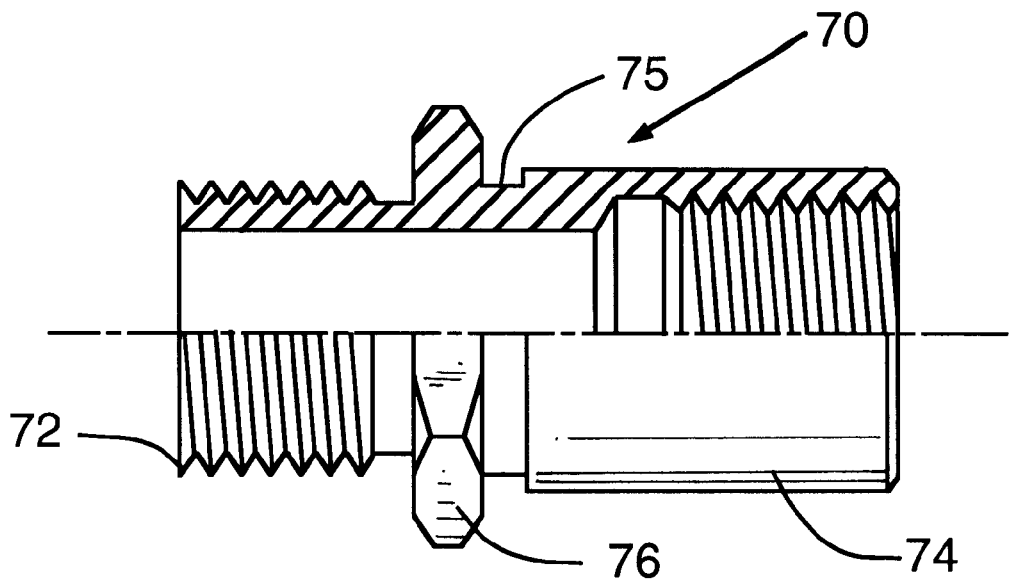
FIG. 5 is a partial cross-sectional view of a preferred coupler of the present invention.
Figure 6:
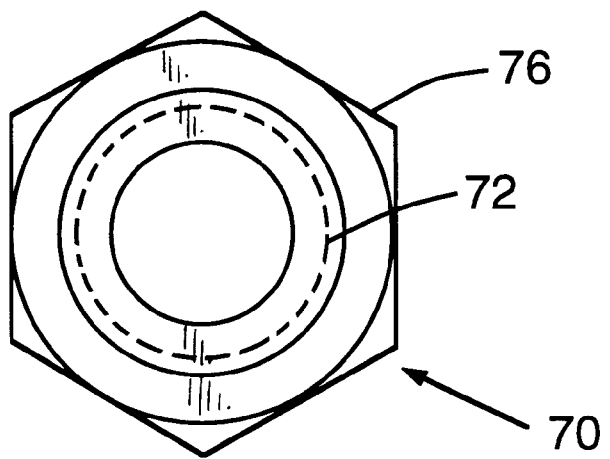
FIG. 6 is an end view of the coupler of FIG. 5.

To attach the adapter ring 50 to the filter-receiving portion 14 of the filter head 12 and to attach the filter 30 to the adapter ring 50, while maintaining the ability to selectively index the adapter ring 50 about an axis A—A, a coupler 70 is preferably employed. As can be seen in FIGS. 1, 5 and 6, coupler 70 preferably comprises a hollow member that has a threaded male portion 72 and a sleeve portion 74 that has internal threads therein. In addition, the coupler 70 has an annular flange 76 that is located between the sleeve portion 74 and the male portion 72. In a preferred embodiment, the outer diameter of the sleeve portion 74 is sized to be slidably and indexably received within the central bore 62 in the adapter ring 50. To achieve a fluid-tight seal between the sleeve portion 74 and the adapter ring 50, an annular channel 75 is provided in sleeve portion 74 for receiving an O-ring 77 therein. The reader will appreciate that O-ring 77 establishes a fluid-tight seal between the sleeve portion 74 and the adapter 50 without hampering the ability to index the adapter ring 50 on the coupler 70 about axis A—A. As shown in FIG. 1, the flange 76 is adapted to abut the lower surface 54 of the adapter ring 50 and the internal threads in the sleeve portion 74 of the coupler 70 is sized to receive the threaded connector 25 of the filter-receiving portion 14. The threaded male portion 72 of the coupler 70 is adapted to be attached to the threaded bore 44 in the filter 20. Thus, when assembled as shown in FIG. 1, the skilled artisan will appreciate that the adapter ring 50 of the subject invention provides the unique and novel ability to selectively index the adapter ring 50 about a central axis A—A to advantageously locate the threaded bore 64.

As can be seen in FIG. 1, the oil is pumped from the oil reservoir 16 by the main oil pump 14 through the first passage 18 in the filter head 12. The oil then passes into the annular passage 22 in the filter-receiving portion 20 of the filter head 12 and through the through passages (60, 60') in the adapter ring 30. The oil then enters the oil filter 30 through holes 48 in the attachment end 42 of the filter 30 as shown in FIG. 1. The unfiltered oil passes through the filter medium 34 and into the discharge passage 38 for passage through the coupler 70 in the adapter ring 50. As the oil exits the coupler 70, it passes through the central return passage 21 in the filter-receiving portion 14 of the filter head 12 and into the second passage 24 in the filter head 12. The skilled artisan will appreciate that the oil then passes through the engine 10 in a known manner and is ultimately received in the oil-receiving reservoir 16 wherein it is again recirculated through the engine 10 by the main oil pump 14.

Figure 7:
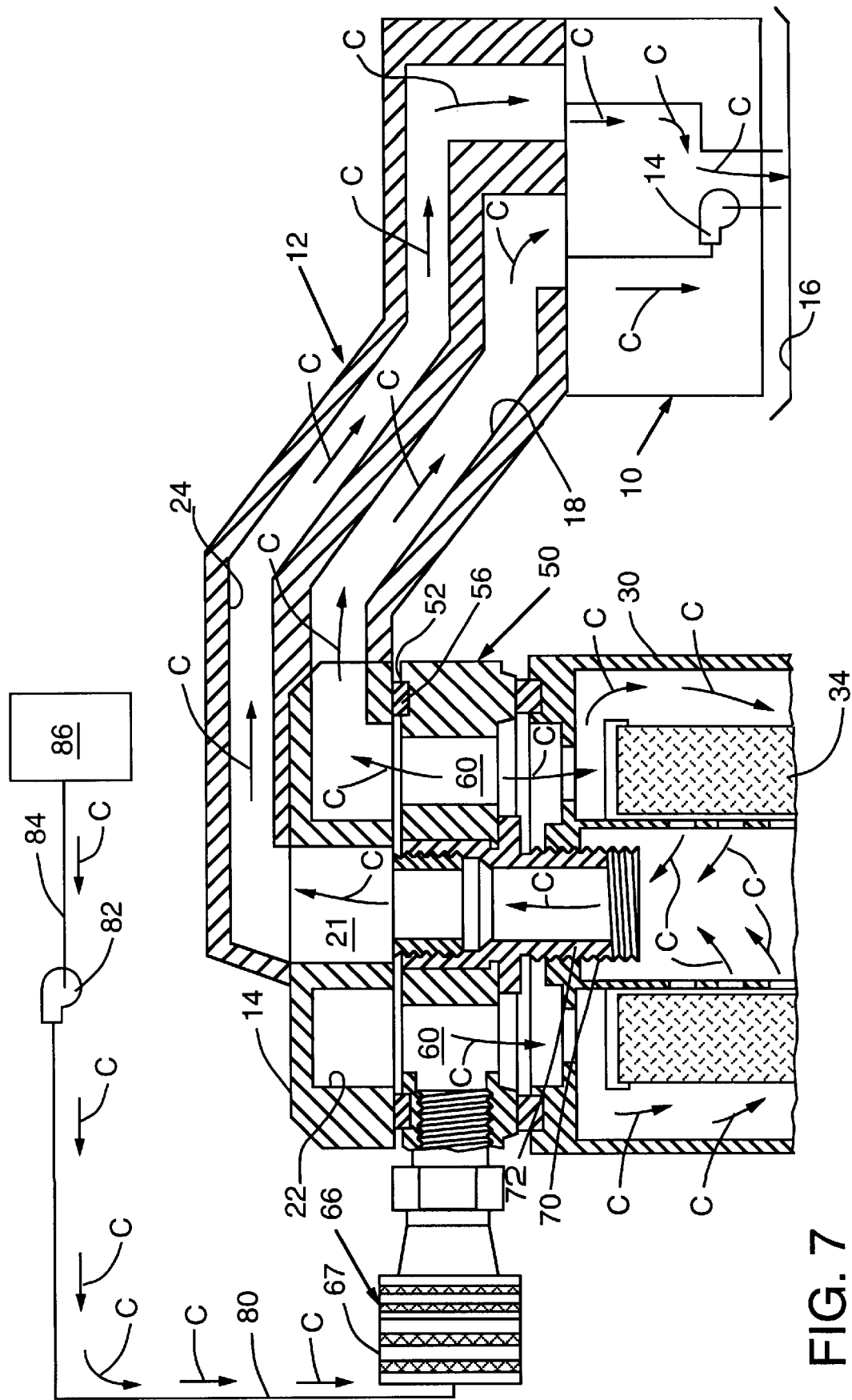
FIG. 7 is a cross-sectional view of the adapter ring and filter head assembly depicted in FIG. 1 with an oil source and fill pump attached to the quick disconnect coupling assembly thereof to facilitate adding lubricant from the source to the engine.

To add oil to the engine 10, a male portion 67 of the quick disconnect coupling assembly 66 is attached in a known manner to the coupling assembly 66. The male portion 67 is coupled to a fill conduit 80 that is attached to the discharge end of an auxiliary pump 82. The suction end of the pump 82 is attached to a second conduit 84 which communicates with a source of oil 86. The skilled artisan will appreciate that when the male portion 67 is inserted into the quick-disconnect coupling assembly 66, it opens the valve therein to create a continuous flow passage from the discharge end of the pump 82 to the through passage 60 that corresponds to the threaded bore 64. As shown in FIG. 7, when the auxiliary pump 82 is operated, oil (represented by arrows "C" in FIG. 7) is pumped from the oil source 86 through conduits (84, 80) and into through passage 60'. The newly added oil then passes through corresponding holes 48 in the attachment end 42 of oil filter 30 and through the filter medium 34. After the oil passes through the filtering medium 34, it pass through the coupler 70 and enters the first and second passages (18, 24). The oil passing through the first passage 18 ultimately stops when it reaches the discharge end of the main oil pump 14; however, that oil flowing through the second passage 24 enters the engine 10. Thus, the adapter ring 50 of the present invention enables additional oil to be quickly added to the engine 10 without the risk of spillage commonly experienced when utilizing prior filling methods. It will be further appreciated that all of the newly added oil is filtered before it enters the engine. Thus, contaminates that are introduced to the oil during the filling process are filtered through the oil filter prior to entering the engine.

Figure 8:
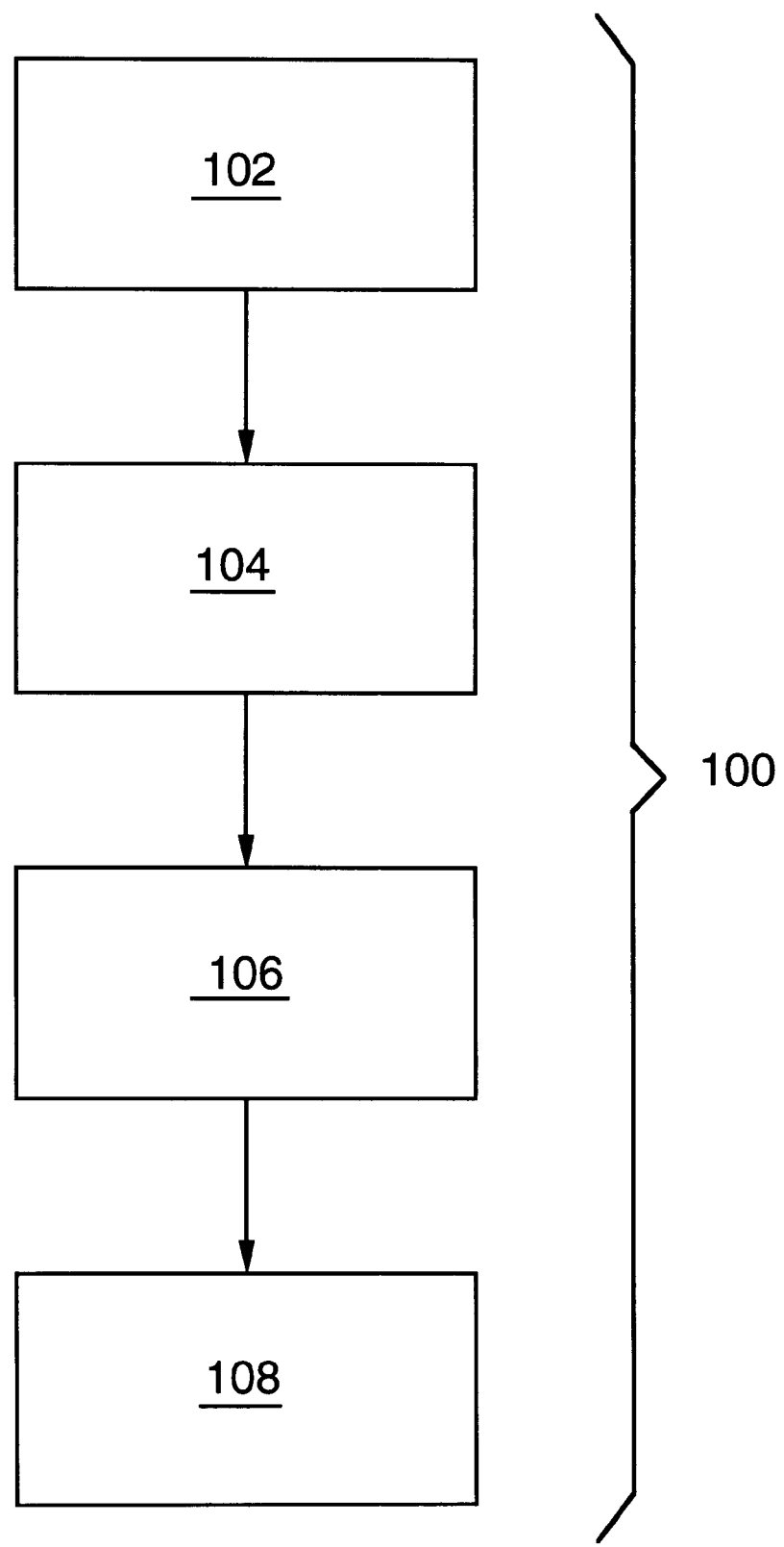
FIG. 8 illustrates the preferred actions of a method of the present invention for adding oil to an engine.

FIG. 8 depicts the actions of a preferred method 100 of adding oil to an engine 10 that has a filter head 12 and an oil filter 30. As can be seen from that Figure, a preferred method comprises the action 102 of installing an adapter ring 50 between the oil filter 30 and the filter head 12 wherein the adapter ring 50 facilitates passage of oil pumped from the engine 10 through the oil filter 30 and ultimately back to the filter head 12. The adapter ring 50 is preferably equipped with coupling assembly 66 that contains a valve that is normally closed. The preferred method 100 further comprises the action 104 of providing a source 86 of oil and an auxiliary pump 82 attached to the source 86 for pumping the oil therefrom. The preferred method 100 further includes the action 106 which comprises attaching a conduit 80 between the pump 82 and coupling assembly 66 such that the valve of the coupling assembly 66 is opened. The preferred method 100 of adding oil to an engine 10 also further comprises the action 108 of pumping oil from the source 86 of oil through the conduit 80 that attaches the pump 82 to the coupling 66 and through the adapter ring 50 into the filter head 12 of the engine 10. When the valve is open, oil flowing therethrough can pass into and through the adapter ring 50 and ultimately into the filter head 12.

Figure 9:
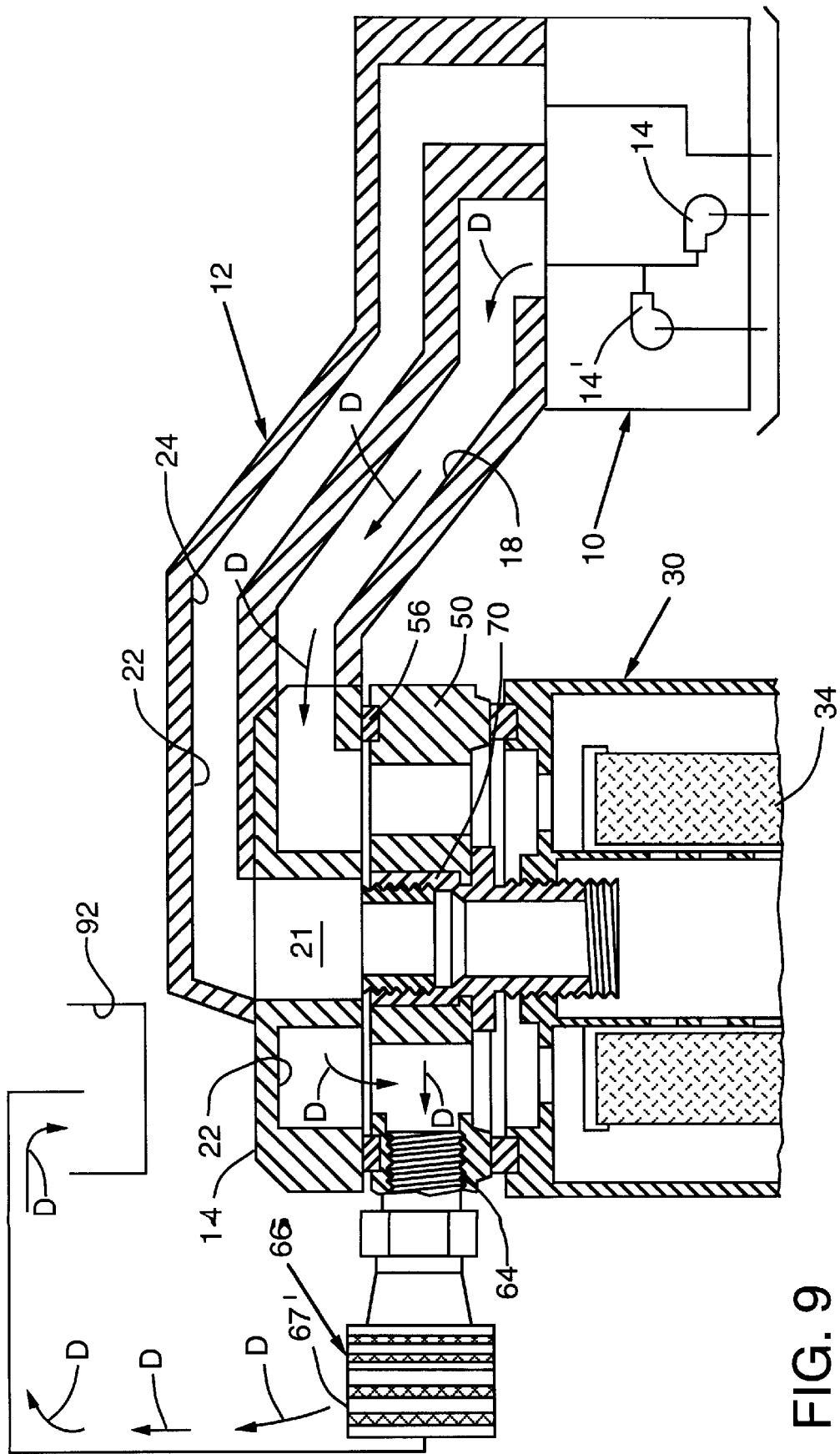
FIG. 9 is a cross-sectional view of the adapter ring and filter head assembly of FIGS. 1 and 7 wherein a drain line is attached to the quick disconnect coupling assembly to enable oil to be pumped out of the engine through the drain line.

Those of ordinary skill in the art will appreciate that the subject invention is also particularly well-suited for draining oil from an engine 10. More specifically, and with reference to FIG. 9, oil can be drained from engine 10 by inserting a male coupling portion 67' of coupling assembly 66 that has a drain conduit 90 attached thereto. The drain conduit 90 can be arranged to discharge into an acceptable collection receptacle 92 for recycling or disposal purposes. Thus, to drain oil from the engine 10, after the male coupling portion 67' has been attached to the coupling assembly 66, either the main pump 14 or a supplemental pump 14' is energized which causes oil (represented by arrows "D") to be pumped from the oil reservoir 16 in the engine 10 through the first passage 18 in the filter head 12 and into the through passage 60' in the adapter ring 50. Because the through passage 60' is larger in diameter than the other through passages 60 and because the coupling assembly 66 and the drain conduit 90 provide a path of least resistance for the oil, a large amount of oil flows through the through passage 60' and ultimately through the drain conduit 90 into the collection receptacle 92.

Figure 10:
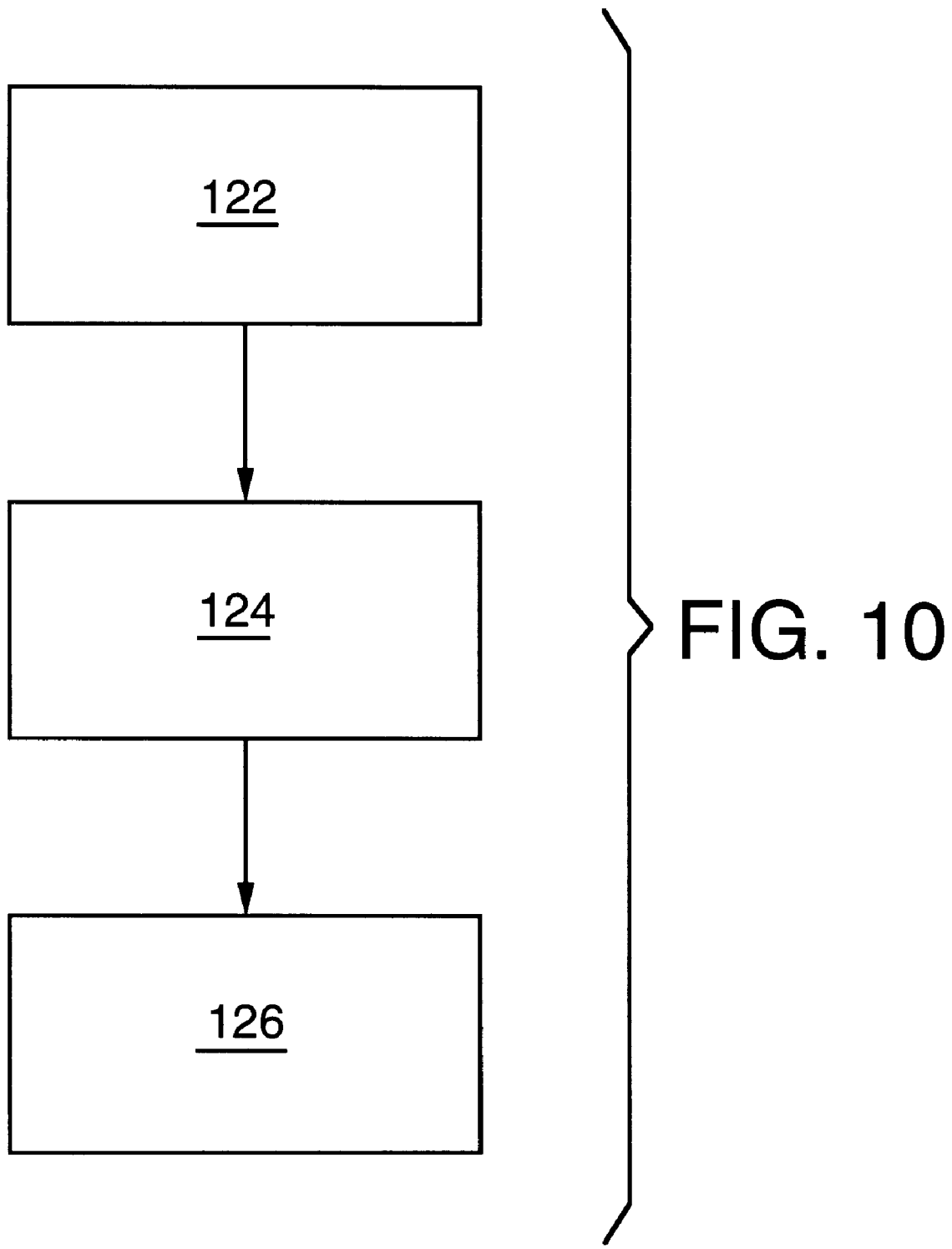
FIG. 10 illustrates the preferred actions of another method of the present invention for draining oil from an engine.

As shown in FIG. 10, a preferred method 120 of the present invention for draining oil from an engine 10 that has a filter head 12 configured to receive an oil filter 30 and that has a main oil pump 14 for pumping oil through the filter head 12 and an oil filter 30 includes the action 122 of installing an adapter ring 50 between the oil filter 30 and the filter head 12 wherein the adapter ring facilitates circulation of oil pumped from the engine through the oil filter 30 and back through the filter head 12. The adapter ring 50 is preferably equipped with a coupling assembly 66 that contains a normally closed valve. The preferred method includes the action 124 of attaching a drain conduit 90 to the coupling assembly 66 such that the valve therein is opened to permit oil flow therethrough. Method 120 further preferably comprises the action 126 of operating the main pump 14 to pump oil through the filter head 12 and through the adapter ring 50 and into the drain line 90.

Figure 14:
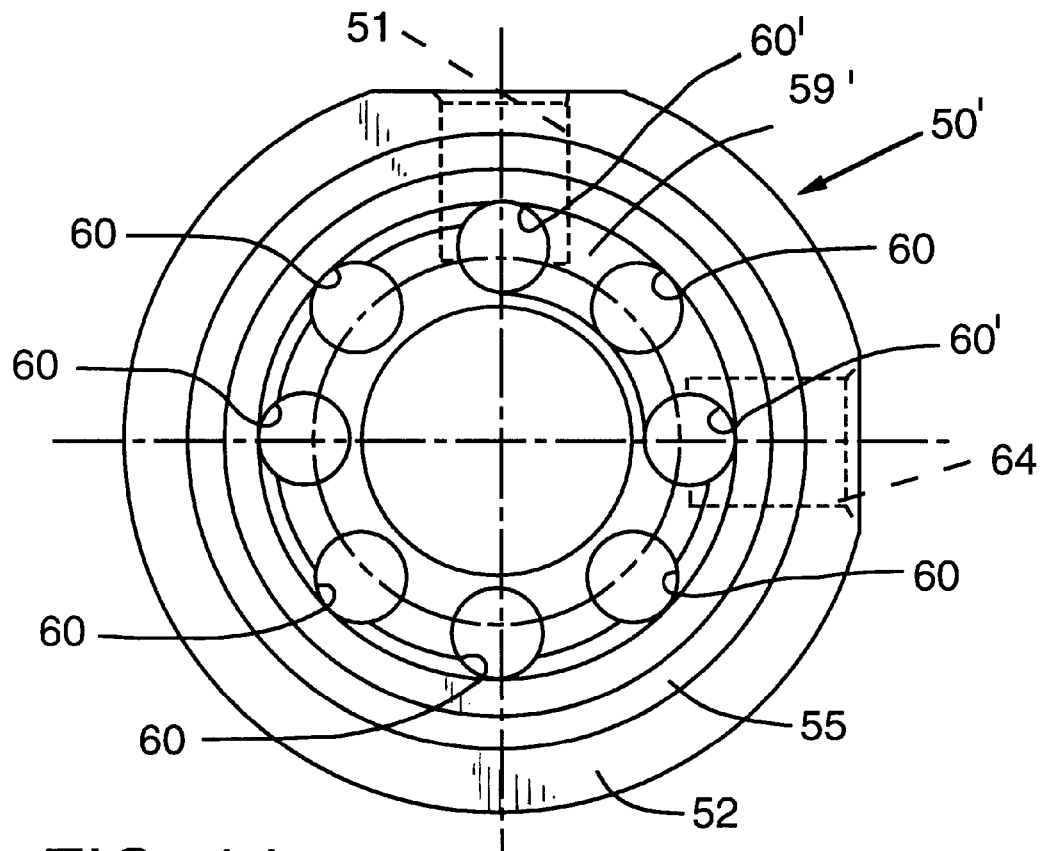
FIG. 14 is a cross-sectional view of a portion of the adapter ring of FIGS. 11–13 taken along line XIV—XIV of FIG. 12.
Figure 15:
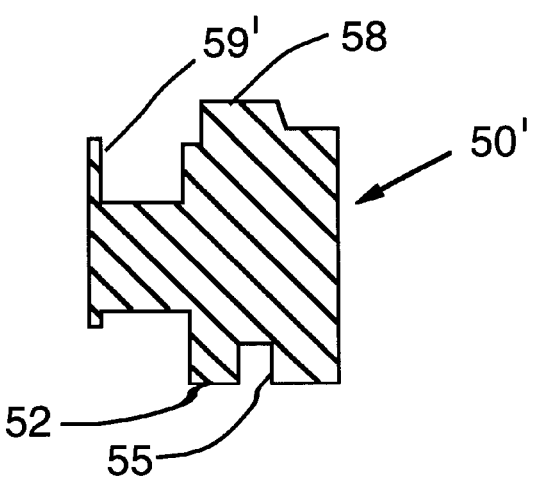
FIG. 15 is a top view of the adapter ring of FIGS. 11–14.

Another preferred embodiment of the present invention is depicted in FIGS. 11–15. As can be seen in those Figures, an adapter ring 50' is attached between the filter head 12 and the oil filter 30 in the manner described above. However, the adapter ring 50' differs from the adapter ring 50 in that it is preferably provided with a second discharge port 51' for attaching an auxiliary conduit 53' thereto. In this preferred embodiment, a low restriction passageway 59' is provided between through passages 60' as shown in FIGS. 14 and 15 to reduce the amount of flow restriction encountered when draining oil through the adapter ring 50'.

Figure 11:
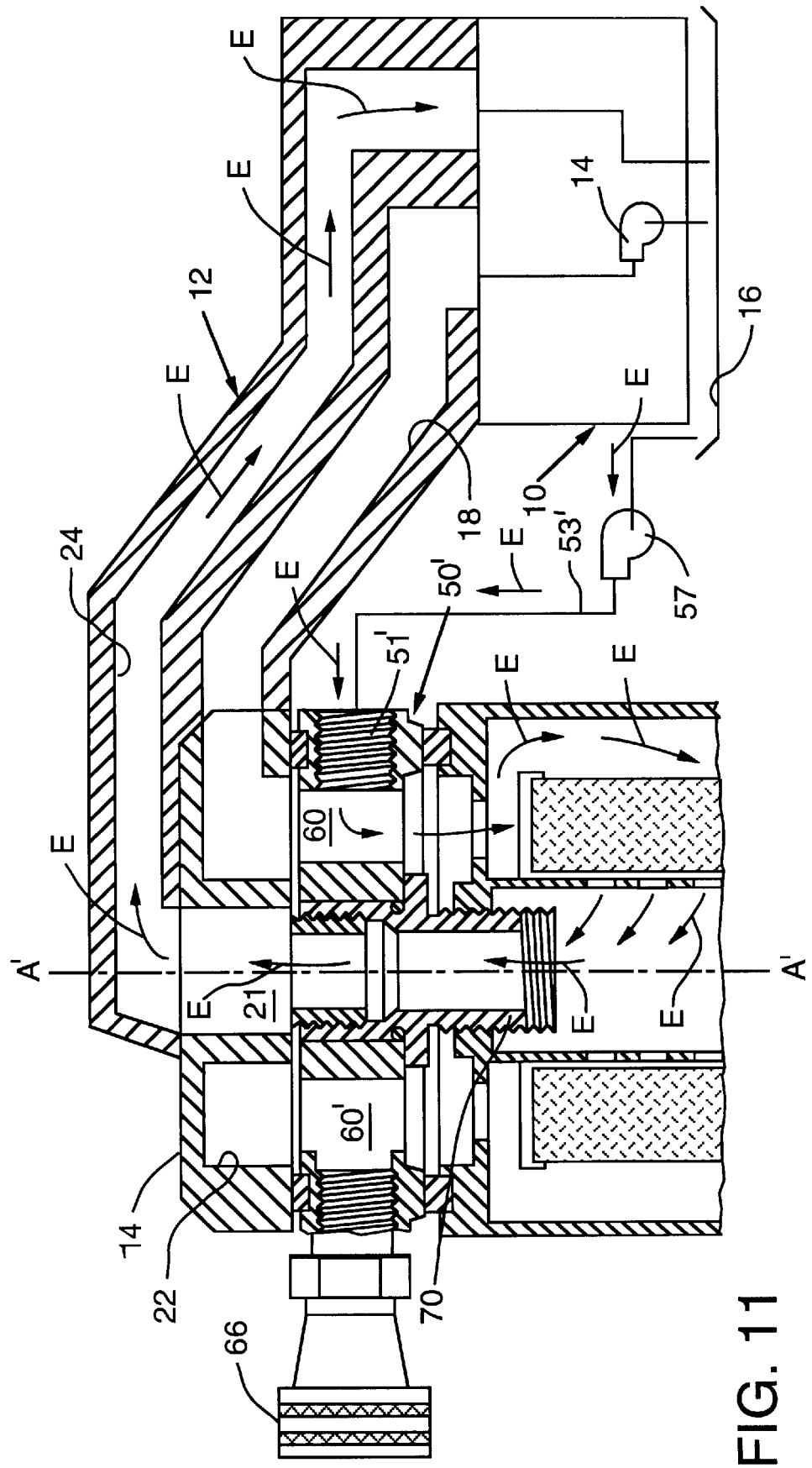
FIG. 11 is a cross-sectional view of another adapter ring attached to a filter head of an engine and employing a supplemental pre-lubrication pump.
Figure 12:
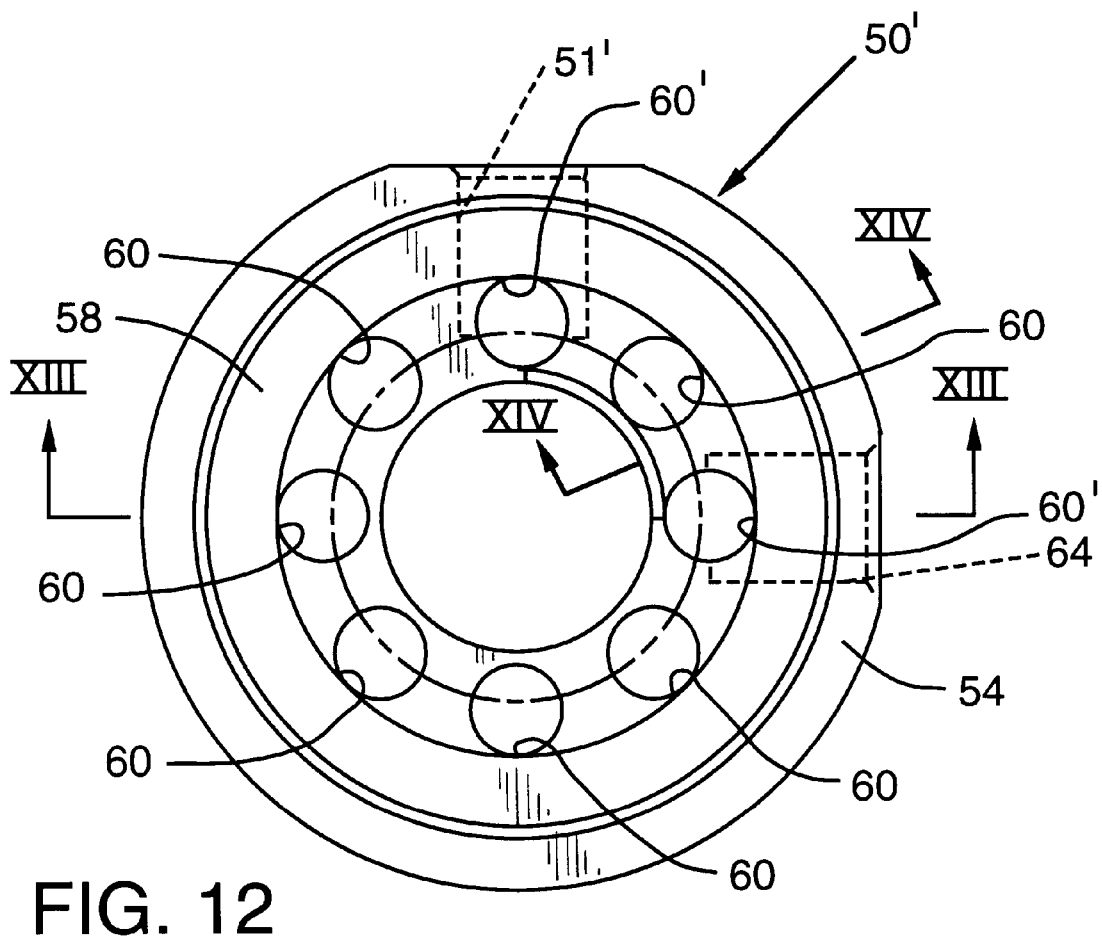
FIG. 12 is a bottom view of the adapter ring depicted in FIG. 11.
Figure 13:
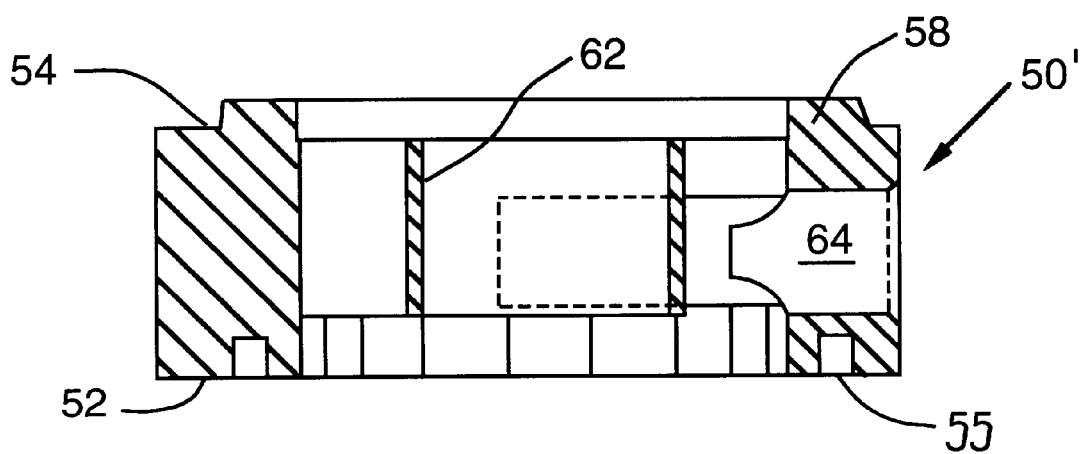
FIG. 13 is a cross-sectional view of the adapter ring of FIGS. 11 and 12 taken across line XIII—XIII of FIG. 12.

As can be seen in FIG. 11, a supplemental pump 57' is preferably attached to the auxiliary conduit 53' and is adapted to draw oil from the oil reservoir 16 of the engine 10 in the manner described in U.S. Pat. No. 4,875,551 to Lulich, the disclosure of which is herein incorporated by reference. The supplemental pump 57' is controlled in a known manner such that it is actuated before the engine is started to pump oil (represented by arrows "E") from the reservoir 16 to the engine cylinders (not shown). More specifically, when actuated, supplemental pump 57' pumps oil through conduit 53' and into the through passage 60' in the adapter ring 50' that corresponds with the port 51'. The oil passes through passage 60' and into the oil filter 30. The oil returns through the central passage 21 in the adapter ring 50' and into the second passage 24 in the filter head 12. A sensor (not shown) attached to the engine for monitoring oil pressure therein communicates with the engine starting circuit and permits the engine to crank when a predetermined amount of oil pressure is achieved therein. Thus, the adapter ring 50' permits a supplemental pump to be employed for pre-lubrication purposes and provides the unique and novel advantage of enabling the ports (51', 64) to be advantageously located by indexing the adapter ring 50' on the coupler 70 about axis A'—A' to accommodate the location of the supplemental pump 57'.

Figure 16:
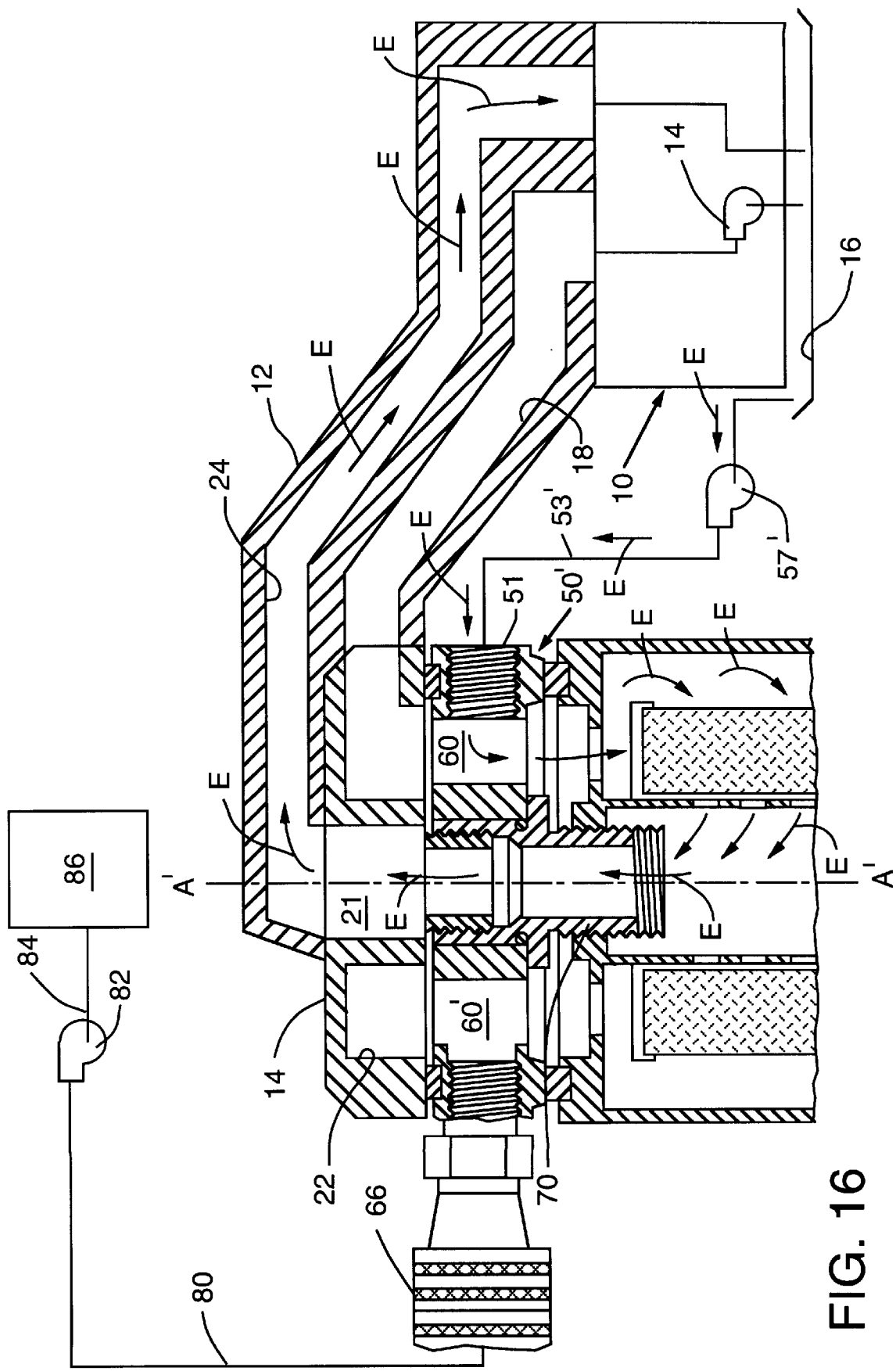
FIG. 16 is cross-sectional view of the adapter ring depicted in FIGS. 12–15 attached to a filter head of an engine with an oil source and fill pump attached to the quick disconnect coupling assembly thereof to facilitate adding lubricant from the source to an engine.
Figure 17:
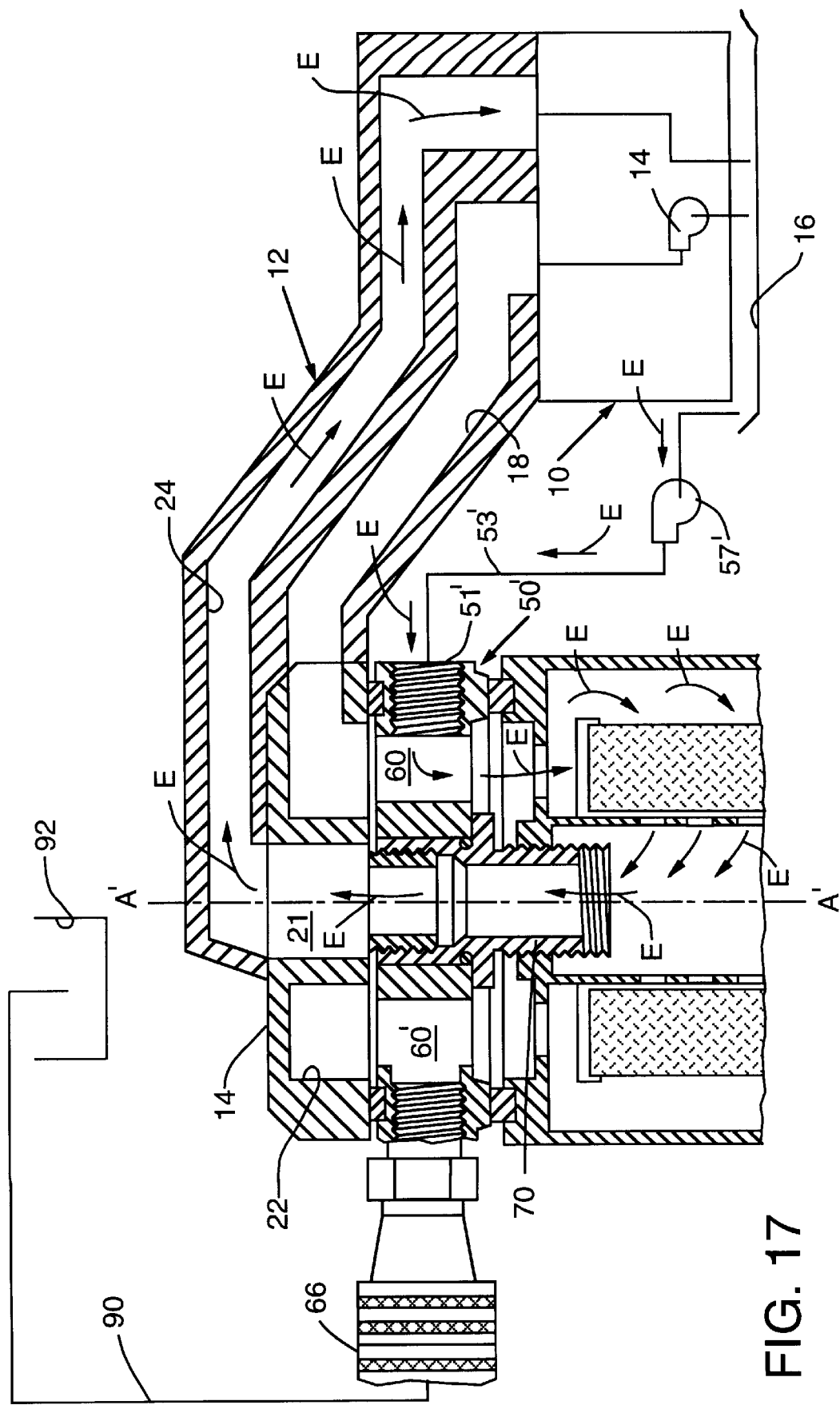
FIG. 17 is a cross-sectional view of another preferred adapter ring and filter head assembly of FIG. 16 wherein a drain conduit is attached to the quick disconnect assembly thereof to enable engine oil to be pumped out of the engine through the drain conduit.

As shown in FIG. 16, the preferred adapter ring 50' can also be employed with an auxiliary pump 82 and a source of replacement oil 86 in the manner described above to add lubricant to engine 10. Likewise, as shown in FIG. 17, the adapter ring 50' can be employed with a drain conduit 90 and receptacle 92 in the manner described above to drain lubricant from engine 10. Those of ordinary skill in the art will appreciate that oil can be drained through the drain conduit 90 by operating the main pump 14 or the supplemental pump 57'.

Figure 18:
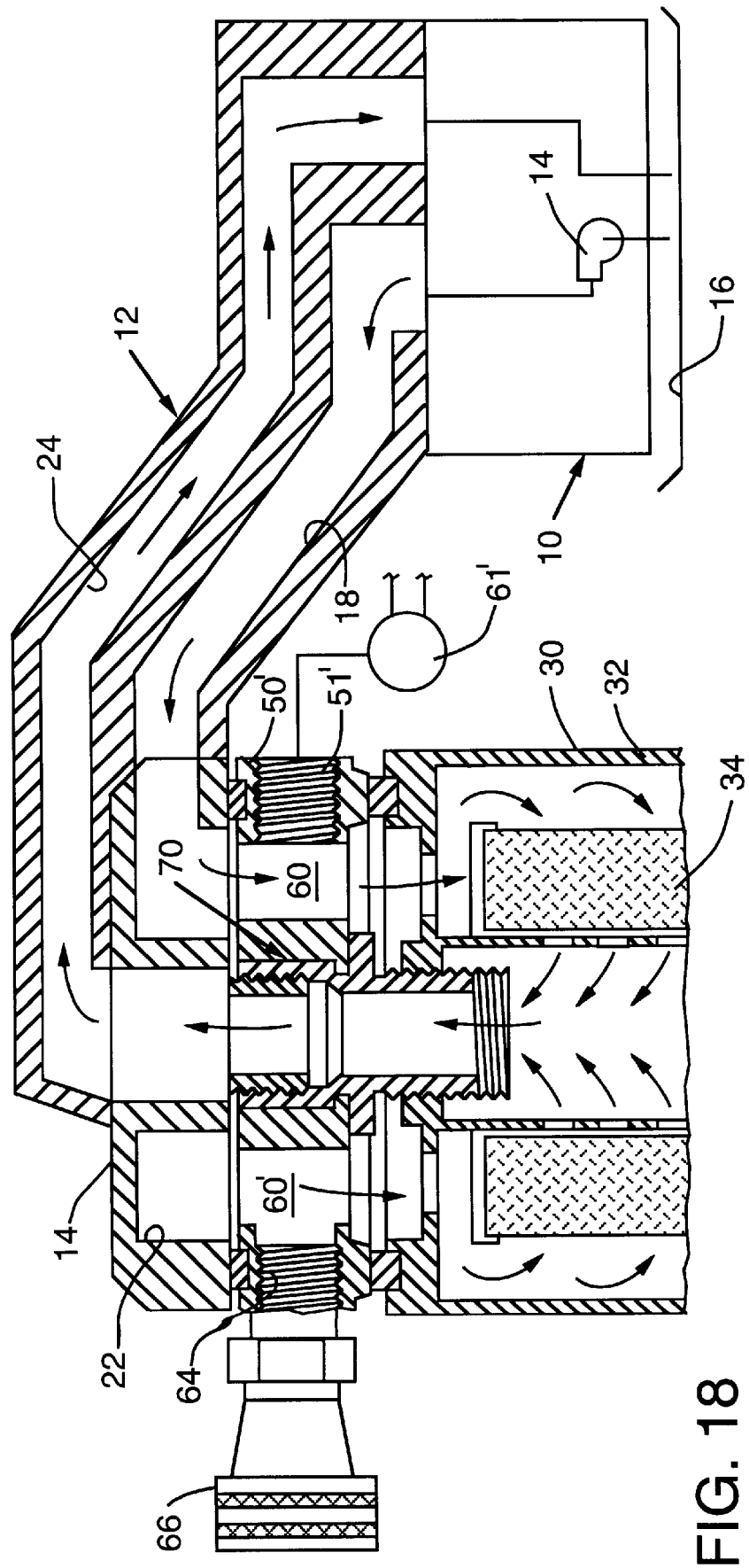
FIG. 18 is a cross-sectional view of the adapter ring depicted in FIGS. 12–15 attached to a filter head of an engine with a sensor attached to the adapter ring.

The preferred adapter ring 50' can also be employed with a commercially available sensor 61' for detecting or monitoring a variety of different conditions within the engine 10. See FIG. 18. For example, sensor 61' can comprise a commercially available pressure sensor for monitoring the pressure of the oil passing through the adapter ring 50'. Sensor 61' may also comprise a commercially available detection device for detecting the presence of ethylene glycol or other chemical in the oil. Preferably, the sensor 61' is attached to the adapter ring 50' through threaded ports 51' or 64. However, if it is desirable to use the sensor 61' in connection with the supplemental pump 57', a third port (not shown) may be provided in the adapter ring 50'. Alternatively, the sensor 61' could be attached to the a male portion of the quick-disconnect coupling assembly 66 for detachment from the adapter ring 50' when adding or draining oil. Sensor 61' preferably communicates in a known manner with an engine control circuit and can be used to provide a warning signal to an indicating device, gauge, etc. located in the vehicle's cab and/or used to control the operation of the supplemental pump 57'.

Figure 19:
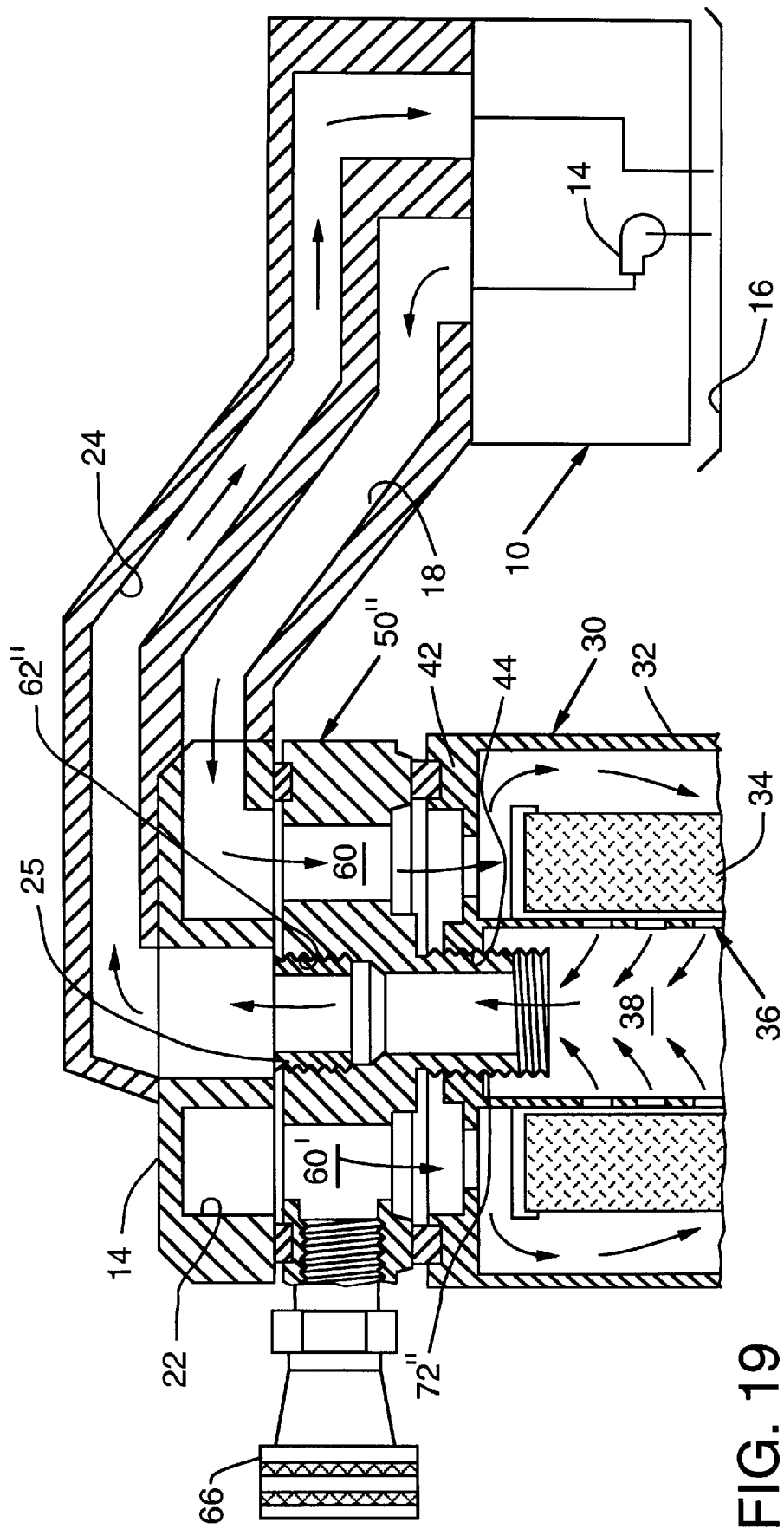
FIG. 19 is a cross-sectional view of another preferred adapter ring of the present invention attached to the filter head of an engine.

In another preferred embodiment of the present invention, the coupler member forms an integral part of the adapter ring. More specifically and with reference to FIG. 19, the adapter ring 50" is preferably identical to the adapter ring 50 described above, except that the center portion of the adapter ring 50" has a threaded bore 62" that is adapted to receive the threaded connector 25 of the filter-receiving portion 20 of the filter head 12. A threaded connector portion 72" also protrudes from the bottom surface 54" of the adapter ring 50" to be threaded into the threaded bore 44 in the oil filter 30. The reader will appreciate that the oil flows through the adapter ring 50" in the same manner as described above for adapter ring 50.

Figure 20:
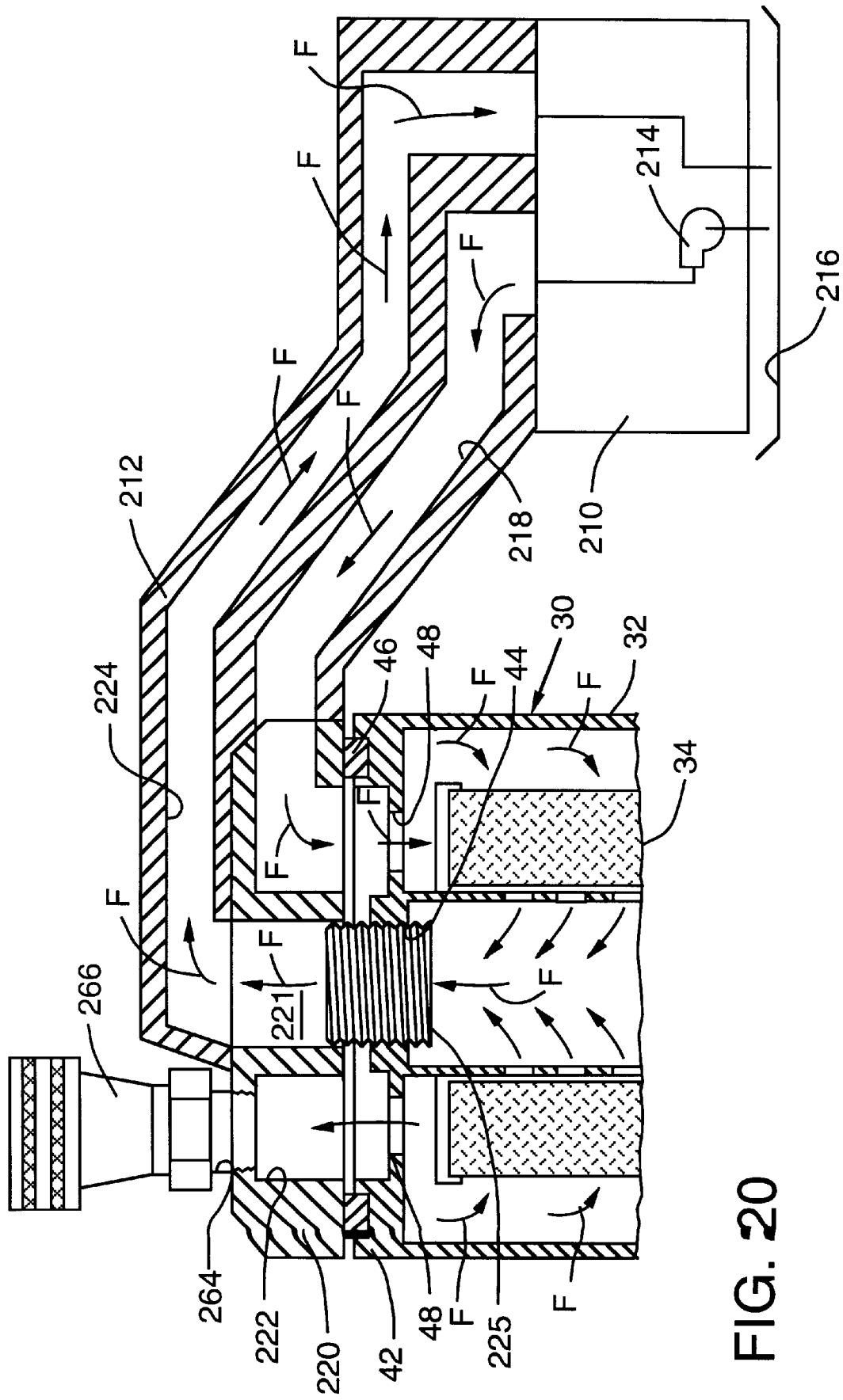
FIG. 20 is a cross-sectional view of a preferred filter head of the present invention with the valve of the quick disconnect coupling assembly thereof in a closed position.
Figure 21:
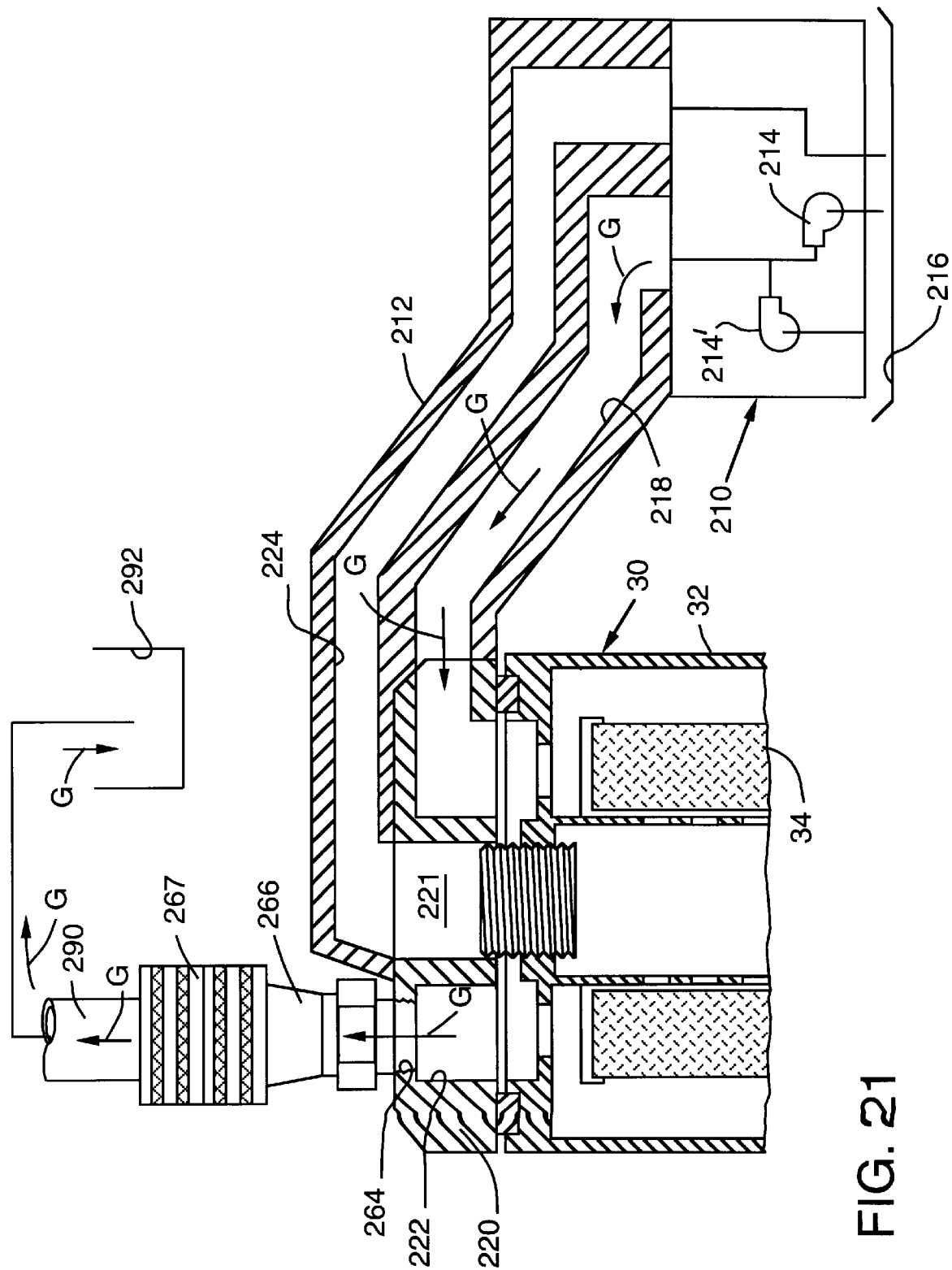
FIG. 21 is cross-sectional view of the filter head of FIG. 20 with a drain conduit attached to the coupling assembly.
Figure 22:
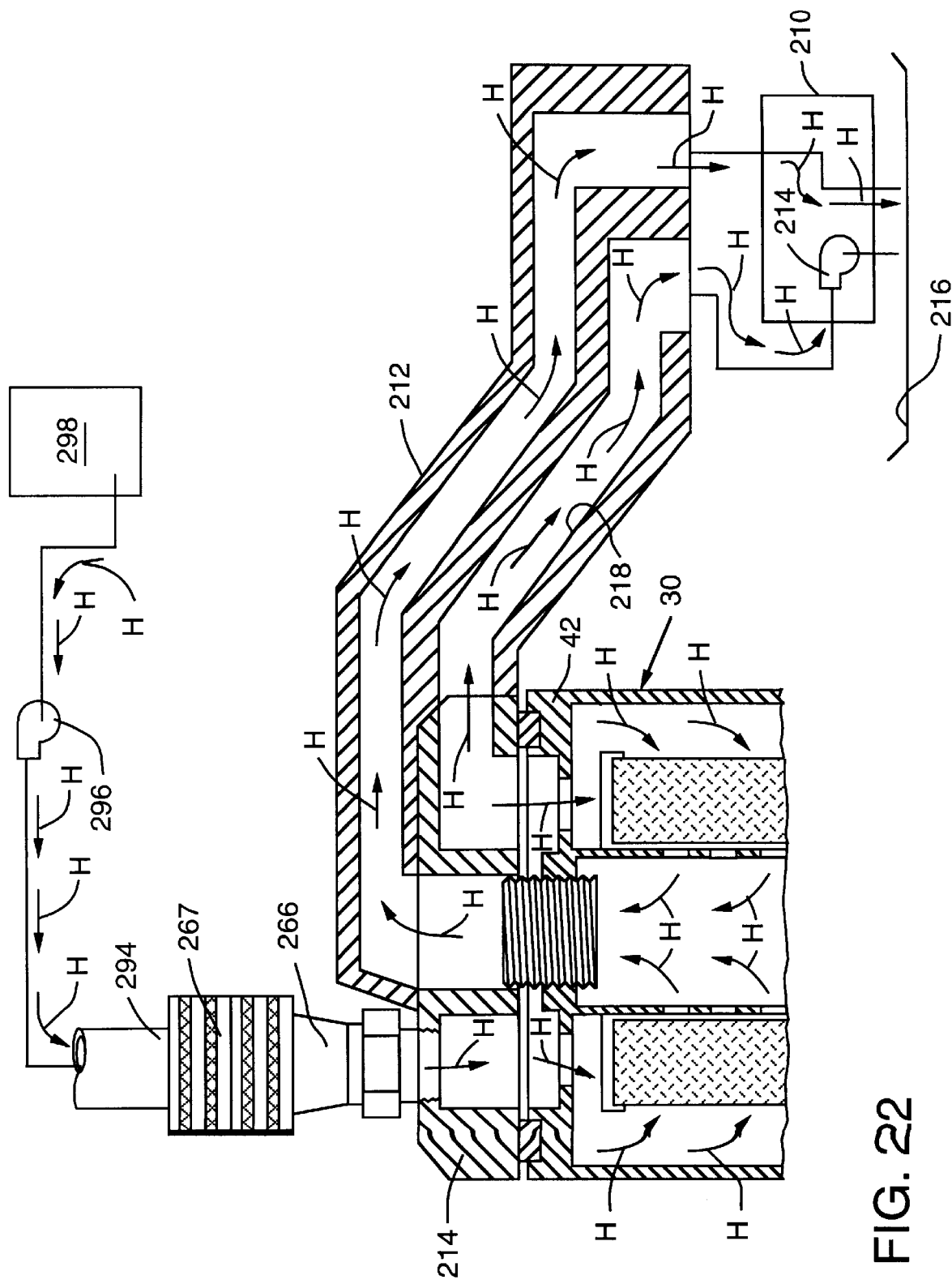
FIG. 22 is a cross-sectional view of the filter head of FIG. 20 with a source of oil and an auxiliary pump attached to the quick disconnect coupling member thereof.

Another preferred embodiment of the present invention is depicted in FIGS. 20–22. As can be seen in those Figures, the filter head 212 of an engine 210 is provided with at least one auxiliary port 264 for receiving a commercially available quick-disconnect coupling assembly 266. As can be seen in FIG. 20, the filter head 212 has a filter-receiving portion 220 for attaching a commercially available oil filter 30, of the type described above, thereto. The filter head 212 has a first passage 218 therein that is attached to a main oil pump 214 in the engine 210. The main oil pump 214 is adapted to pump oil from the oil reservoir or pan 216 of the engine 210. The first passage 218 adjoins an annular passage 222 in the filter-receiving portion 220. The filter-receiving portion 214 is also provided with a central passage 221 that adjoins a second passage 224 in the filter head 212. The passage 224 provides a pathway for the oil to pass through the engine and ultimately back into the oil reservoir 216. Coaxially aligned with the central passage 221 is a threaded connector portion 225 of the filter-receiving portion 220 which is sized to be screwed into a threaded bore 44 of an oil filter 30. Those of ordinary skill in the art will appreciate that the O-ring 46 of the oil filter 30 serves to establish an fluid-tight seal between the filter-receiving portion 220 and the filter 30.

As can be seen in FIGS. 20–22, a threaded bore or auxiliary port 264 is provided through the filter-receiving portion 220 such that it communicates with the annular passage 222 therein. Such port 264 enables the coupling assembly 266 to be attached to the filter head 212. As shown in FIG. 20, during normal operation of engine 210, the valve of the coupling assembly 266 is closed such that the main pump 214 pumps oil (represented by arrows "F") from the oil reservoir 216 through the first passage 218 into the annular passage 222. The oil then passes through holes 48 in the oil filter attachment end 42 and into the oil filter 30 in the manner described above. Oil reenters the filter head 212 through the central passage 221 and then passes through the second passage 224 into the engine 210.

The skilled artisan will appreciate that the filter head 212 of the present invention can be advantageously used to drain oil from the engine 210 as shown in FIG. 21. In this preferred embodiment, a male coupling portion 267 is attached to the coupling 266 in a known manner such that the coupling portion causes the valve of the coupling assembly 266 to open. A drain conduit 290 is attached to the male coupling portion and is preferably arranged to discharge into an appropriate collection receptacle 292. To drain the oil from the engine 210, the main pump 214 or an auxiliary pump 214' is operated to pump oil (represented by arrows "G") through passage 218 and into the annular passage 222 in the filter-receiving portion 220 for discharge through the coupling assembly 266 into the drain conduit 290.

The preferred filter head 212 can also be used to add oil in an expedient manner, by attaching a first conduit 294 to the male coupling portion 267. The first conduit is attached to the discharge of an auxiliary pump 296 that is arranged to draw oil (represented by arrows "H") from a source 298. Thus, oil can be pumped from the source 298 to the engine 210 by energizing the auxiliary pump 296. See FIG. 22.

Figure 23:
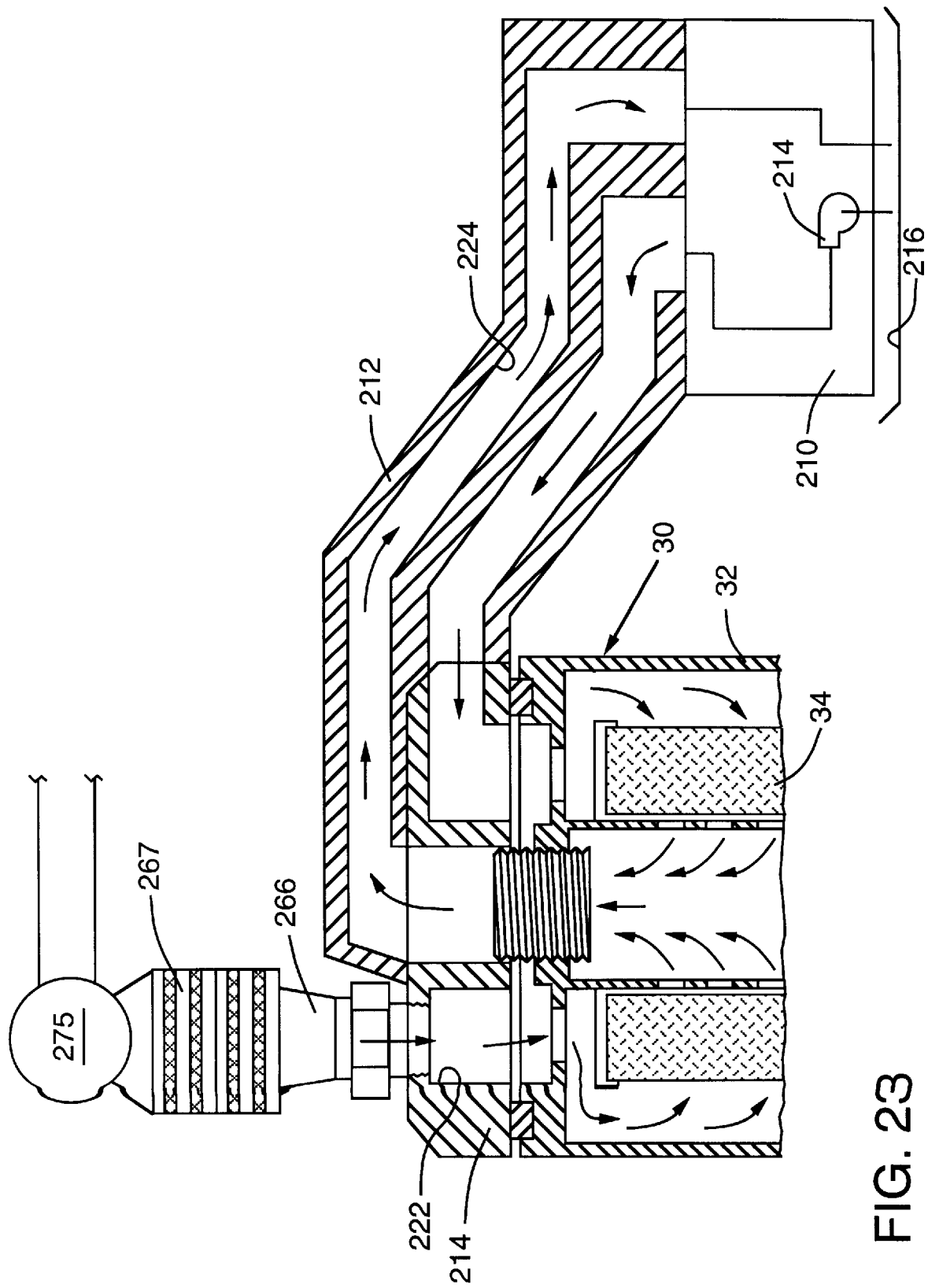
FIG. 23 is a cross-sectional view of the filter head of FIG. 20 with a sensor attached to the quick disconnect coupling assembly thereof.

As shown in FIG. 23, a commercially available sensor 275 may be attached to the male coupling portion 267 of the quick disconnect coupling assembly 266 for monitoring the oil pressure or content of the oil stream.

Figure 24:
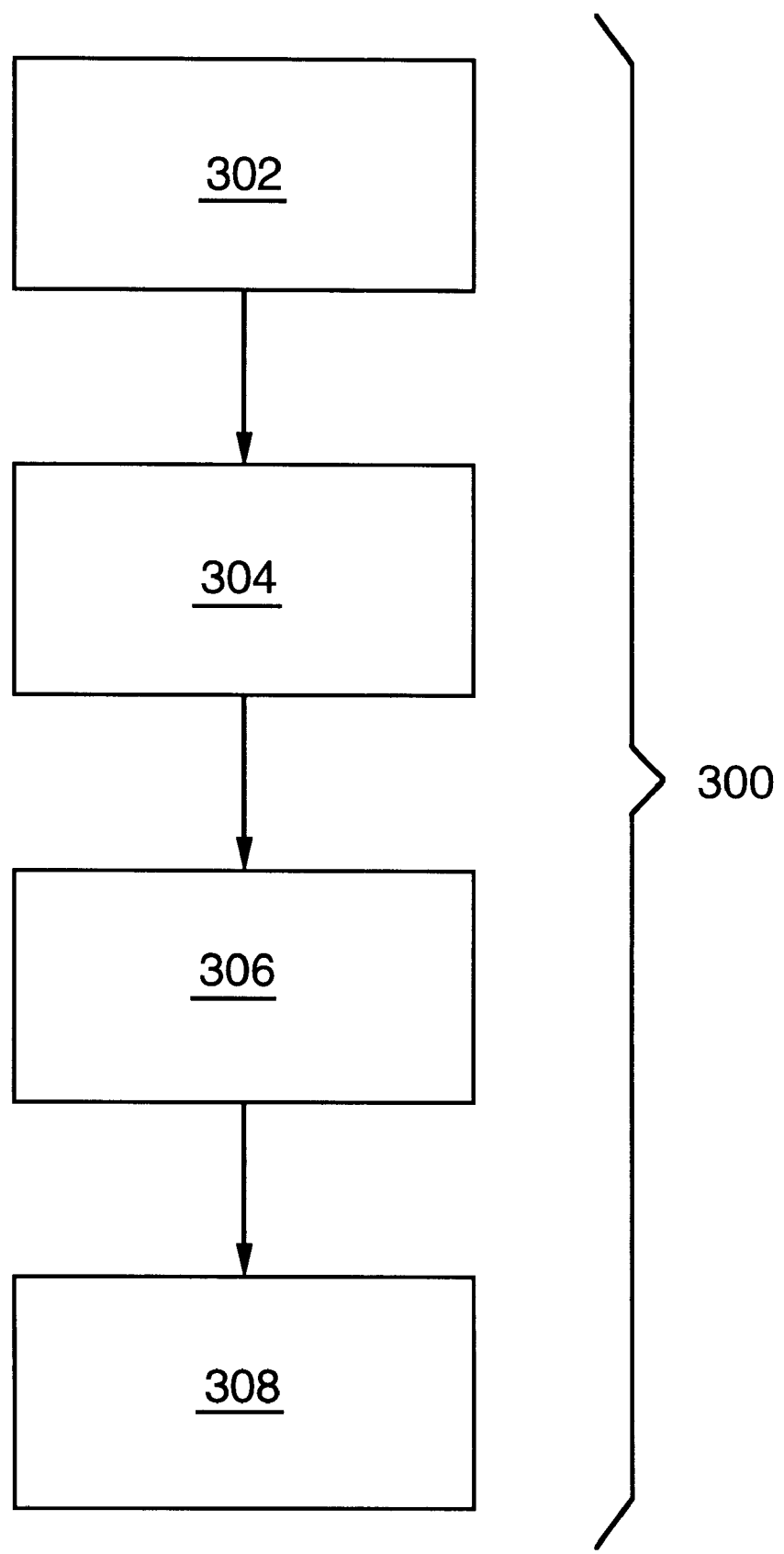
FIG. 24 illustrates the actions of another preferred method of the present invention for draining oil from an engine.

FIG. 24 depicts a preferred method 300 of the present invention for draining oil from an engine 210 that has a main pump 214 that is adapted to circulate oil through the engine 210 and an oil filter 30 that is attached to a filter head 212 of the engine 210. The method 300 preferably comprises the action 302 of providing an auxiliary port 264 in the filter head 212. The method 300 also preferably comprises the action 304 of attaching a coupling assembly 266 to the port 264. The coupling assembly 266 includes a valve that is normally closed but is selectively openable. Another preferred action 306 of method 300 comprises removably attaching a drain conduit 290 to the coupling 266 such that the valve assembly is opened to permit oil to flow from the filter head 212 to the drain conduit 290. Another preferred action 308 of method 300 comprises operating the main oil pump 214 or auxiliary pump 214' to pump oil through the filter head 212 into the drain conduit 290.

Figure 25:
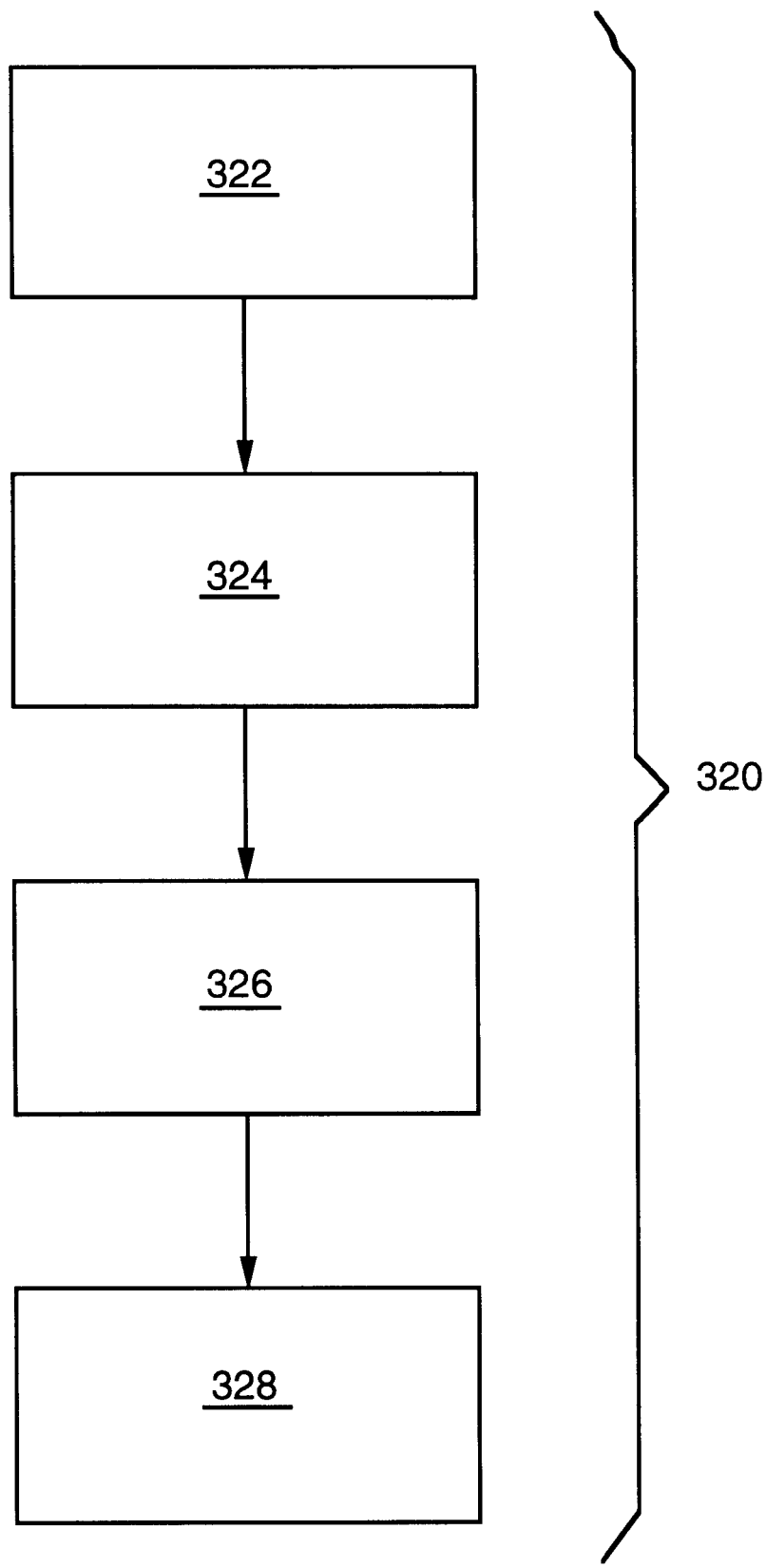
FIG. 25 illustrates the actions of another preferred method of the present invention for adding oil to an engine.

Another preferred method 320 of the present invention can be employed to add oil to an engine 210 that has a filter head 212 for attaching an oil filter 30 to the engine 210 to filter the oil as it is circulated in the engine 210. As can be seen in FIG. 25, method 320 preferably comprises the action 322 of providing an auxiliary port 264 in the filter head 212. The method 320 also preferably comprises the action 324 of attaching a coupling assembly 266 to the port 264. The coupling assembly 266 has a valve that is normally closed but that can be opened to permit oil to flow through the assembly 266. Another preferred action 326 comprises connecting a pump 296 that is attached to source 298 of oil to the coupling assembly 266 such that the valve thereof is opened to permit oil to flow from the source 298 of oil into the filter head 212. Another preferred action 328 of the method 320 comprises operating the pump 296 to pump oil from the source 298 into the filter head 212.

Accordingly, the present invention provides solutions to the aforementioned problems associated with prior engine lubrication systems. The preferred adapter rings and filter heads of the present invention enable oil to be quickly drained from and added to an engine with little or no spillage. Such adapter ring arrangements of the present invention are adapted to be selectively indexed to enable ports therein to be conveniently accessed for attachment to a supplemental pre-lubrication pump or a sensor for detecting oil pressure or the presence of unwanted chemicals in the oil stream. Thus, the present invention provides many improvements and advantages not found in prior lubrication systems for engines. It will be understood, however, that various changes in the details, materials and arrangement of parts which have been herein described and illustrated in order to explain the nature of the invention may be made by those skilled in the art within the principle and scope of the invention as expressed in the appended claims.

What is claimed is:

1. Apparatus for changing oil in an engine that has an oil pump for circulating oil through an oil filter attached to a filter head of the engine comprising:

an adapter ring having at least one passage therethrough for receiving oil from the filter head and at least one first auxiliary port communicating with at least one said passage, said adapter ring further having a return bore therein;

a coupler for attaching said adapter ring to said filter head such that a first fluid-tight seal is achieved between said adapter ring and said filter head and such that said adapter ring can be selectively indexed relative to said filter head about a first axis, said coupler having an attachment portion for removably attaching said oil filter thereto such that a second fluid-tight seal is achieved between said oil filter and said adapter ring while permitting oil to flow through said passages in said adapter ring into said oil filter to filter said oil, said coupler further facilitating passage of said filtered oil through said adapter ring to said filter head, said coupler having a hollow threaded sleeve portion adapted to be rotatable received within said return bore in said adapter ring, said hollow sleeve portion adapted to receive therein a first hollow threaded connector protruding from said filter head for attaching said coupler to said filter head, said coupler having a second hollow threaded connector portion coaxially aligned with said hollow threaded sleeve portion to permit passage of oil through said second hollow threaded connector portion and said hollow sleeve portion and a flange member protruding from said coupler between said hollow sleeve portion and said second hollow threaded connector for urging said adapter ring into fluid-tight engagement with said filter head when said hollow sleeve portion is received in said return bore and is attached to said first hollow threaded connector of said filter head;

a seal ring attached to said connector to establish a third fluid-tight seal between said coupler and said adapter ring while permitting said adapter ring to be selectively indexed about said axis; and a coupling assembly corresponding to each said auxiliary port and attached thereto, said coupling assembly constructed to selectively block said corresponding auxiliary port and permit said corresponding auxiliary port to be opened upon attachment of a first conduit thereto to permit oil to pass from said adapter ring through said first conduit.

2. The apparatus of claim 1 wherein said adapter ring has a second auxiliary port for attaching a second conduit thereto and wherein said second conduit is attached to a supplemental pump that is adapted to pump oil from an oil reservoir in said engine.

3. The apparatus of claim 2 wherein a sensor member is attached to said second auxiliary port.

4. The apparatus of claim 1 wherein said first conduit is a drain conduit that is arranged for discharge into a drain receptacle.

5. The apparatus of claim 1 wherein said first conduit is attached to an auxiliary pump that is coupled to a source of oil such that when said auxiliary pump is operated, oil is pumped from said source of oil through said first conduit into said adapter ring to said filter head.

6. The apparatus of claim 1 wherein said adapter ring is fabricated from aluminum.

\* \* \* \* \*